United States Patent
Li et al.

(10) Patent No.: US 12,425,944 B2
(45) Date of Patent: Sep. 23, 2025

(54) METHOD AND APPARATUS FOR RECEIVING AND TRANSMITTING SIGNALS AND A COMMUNICATION SYSTEM

(71) Applicant: FUJITSU LIMITED, Kawasaki (JP)

(72) Inventors: Guorong Li, Beijing (CN); Meiyi Jia, Beijing (CN); Yang Lu, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 18/133,805

(22) Filed: Apr. 12, 2023

(65) Prior Publication Data
US 2023/0247514 A1  Aug. 3, 2023

Related U.S. Application Data

(63) Continuation of application No. PCT/CN2020/122555, filed on Oct. 21, 2020.

(51) Int. Cl.
*H04W 36/36* (2009.01)
*H04W 36/00* (2009.01)
*H04W 74/0833* (2024.01)
*H04W 88/08* (2009.01)

(52) U.S. Cl.
CPC ..... *H04W 36/362* (2023.05); *H04W 36/0058* (2018.08); *H04W 74/0833* (2013.01); *H04W 88/08* (2013.01)

(58) Field of Classification Search
CPC ........... H04W 36/362; H04W 36/0058; H04W 74/0833; H04W 88/08
See application file for complete search history.

(56) References Cited

U.S. PATENT DOCUMENTS

| | | |
|---|---|---|
| 2021/0368409 A1 | 11/2021 | Liu et al. |
| 2022/0322464 A1 | 10/2022 | Luo et al. |
| 2023/0156848 A1* | 5/2023 | Zhu ............ H04W 74/0833 370/329 |

FOREIGN PATENT DOCUMENTS

| | | |
|---|---|---|
| CN | 111093286 A | 5/2020 |
| CN | 111148163 A | 5/2020 |
| CN | 111586744 A | 8/2020 |
| WO | 2020/057732 A1 | 3/2020 |

OTHER PUBLICATIONS

International Search Report and Written Opinion of the International Searching Authority issued by the China National Intellectual Property Administration for corresponding International Patent Application No. PCT/CN2020/122555, mailed on Jul. 22, 2021, with English translation.

(Continued)

*Primary Examiner* — Wayne H Cai
(74) *Attorney, Agent, or Firm* — Myers Wolin, LLC

(57) ABSTRACT

An apparatus for receiving and transmitting signals, applicable to an integrated access and backhaul (IAB) node, includes a first receiver configured to receive a first reconfiguration message, and a first transmitter configured to transmit indication information to a radio device, the indication information being used to indicate that the radio device applies configuration in a second reconfiguration message.

20 Claims, 11 Drawing Sheets

(56) References Cited

OTHER PUBLICATIONS

Huawei et al., "Consideration of inter-CU migration", Agenda Item: 8.4.2, 3GPP TSG-RAN WG2 Meeting #111-e, R2-2007863, Online, Aug. 17-28, 2020.
CATT, "Group Handover in Inter IAB donor-CU", Agenda Item: 13.2.1, 3GPP TSG-RAN3 Meeting #109-e, R3-204733, E-meeting, Aug. 17-28, 2020.
ZTE et al., "Discussion on network-controlled IAB migration handling", Agenda Item: 13.3.2.1, 3GPP TSG-RAN WG3 Meeting #103, R3-190542, Athens, Greece, Feb. 25-Mar. 1, 2019.
Huawei, "Inter IAB donor-CU topology adaptation", Agenda Item: 13.3.2.3, 3GPP TSG-RAN WG3 Meeting #107-e, R3-200763, Resubmission of R3-196995, E-meeting, Feb. 24-Mar. 6, 2020.
First Notification of Office Action and Search Report issued by the China National Intellectual Property Administration for corresponding Chinese Patent Application No. 202080106036.1, mailed on May 30, 2024, with an English translation.
Qualcomm Incorporated, "Enhancements to Intra-donor IAB-node-Migration", Agenda Item: 13.2.2, 3GPP TSG-RAN WG3 Meeting #109-e, R3-204796, E-meeting, Aug. 17-28, 2020.

* cited by examiner

METHOD AND APPARATUS FOR RECEIVING AND TRANSMITTING SIGNALS AND A COMMUNICATION SYSTEM

CROSS-REFERENCE TO RELATED APPLICATION

This application is a continuation application of International Application PCT/CN2020/122555 filed on Oct. 21, 2020 and designated the U.S., the entire contents of which are incorporated herein by reference.

FIELD

This disclosure relates to the field of communication technologies.

BACKGROUND

Integrated access and backhaul (IAB) technology enables 5G RAN to support radio relay. An integrated access and backhaul node (IAB-node) supports access and backhaul via New Radio (NR). A termination point of NR backhaul in a network side is referred to as an IAB-donor, which represents a network device supporting an IAB function (such as a gNB). The backhaul may occur in a single hop or multiple hops.

The IAB-node supports a function of a gNB-DU (distributed unit), an IAB-node DU is also referred to as an IAB-DU, which is an end point of a New Radio access (NR access) interface to a terminal equipment (UE) and a next hop of IAB-node, and is also an end point of an F1 protocol to a gNB-CU (central unit) on the IAB-donor.

In addition to the gNB-DU function, the IAB-node also supports some functions of the UE, referred to as an IAB-MT. The IAB-MT includes, for example, physical layer, layer 2, RRC and NAS functions to be connected to a gNB-DU on another IAB-node or IAB-donor, gNB-CU on the IAB-donor and a core network.

In the IAB topology, the IAB-node under the IAB-donor is connected to the IAB-donor via one or more hops, and the IAB-donor is a root node.

FIG. 1 is a schematic diagram of the IAB topology. As shown in FIG. 1, in IAB topology 10, an IAB-node 100 includes an IAB-MT functional unit 101 and an IAB-DU functional unit 102, neighboring nodes on an interface of the IAB-DU functional unit 102 are referred to as child nodes, such as child nodes 201, 202 and 203 shown in FIG. 1, and neighboring nodes on an interface of the IAB-MT functional unit 101 are referred to as parent nodes, such as parent nodes 301 and 302 shown in FIG. 1.

As shown in FIG. 1, a direction from IAB-node 100 to child nodes 201, 202 and 203 is referred to as a downstream direction, and a direction from IAB-node 100 to parent nodes 301 and 302 is referred to as an upstream direction. And the IAB-donor (not shown) executes centralized resource, topology and routing management for the IAB topology 10.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when an IAB-node is migrated from a parent node to another parent node, how to reconfigure child nodes and/or terminal equipments under the IAB-node is not concerned in existing technologies.

In order to solve at least one of the above problems, embodiments of this disclosure provide a method and apparatus for receiving and transmitting signals and a communication system, in which an integrated access and backhaul node (IAB-node) receives a first reconfiguration message, and transmits indication information to a radio device, so that the radio device applies configuration in a second reconfiguration message, therefore the radio devices can perform handover or reconfiguration.

According to an aspect of the embodiments of this disclosure, there is provided an apparatus for receiving and transmitting signals, provided in an integrated access and backhaul (IAB) node, the apparatus for receiving and transmitting signals including:
  a first receiving unit configured to receive a first reconfiguration message; and
  a first transmitting unit configured to transmit indication information to a radio device, the indication information being used to indicate that the radio device applies configuration in a second reconfiguration message.

According to another aspect of the embodiments of this disclosure, there is provided a signal receiving apparatus, provided in a radio device, the signal receiving apparatus including:
  a receiving unit configured to receive a second reconfiguration message; and
  a third receiving unit configured to receive indication information, the indication information being used to indicate that the radio device applies configuration in the second reconfiguration message in a radio resource control layer.

According to a further aspect of the embodiments of this disclosure, there is provided an apparatus for transmitting a signal, provided in a source central unit, the apparatus for transmitting a signal including:
  a fourth transmitting unit configured to transmit a first reconfiguration message to an integrated access and backhaul node; and
  a fifth transmitting unit configured to transmit a second reconfiguration message to a radio device, in the second reconfiguration message, a target candidate cell having the same identifier as a current serving cell of the integrated access and backhaul node is configured once.

According to still another aspect of the embodiments of this disclosure, there is provided a method for receiving and transmitting signals, including:
  receiving a first reconfiguration message by an integrated access and backhaul node; and
  transmitting indication information by the integrated access and backhaul node to a radio device, the indication information being used to indicate that the radio device applies configuration in a second reconfiguration message.

According to yet another aspect of the embodiments of this disclosure, there is provided a signal receiving method, including:
  receiving a second reconfiguration message by a radio device; and
  receiving indication information by the radio device, the indication information being used to indicate that the radio device applies configuration in the second reconfiguration message in a radio resource control layer.

According to yet still another aspect of the embodiments of this disclosure, there is provided a method for transmitting a signal, including:

transmitting a first reconfiguration message by a central unit to an integrated access and backhaul node; and transmitting a second reconfiguration message by the central unit to a radio device, in the second reconfiguration message, a target candidate cell having the same identifier as a current serving cell of the integrated access and backhaul node is configured once.

An advantage of the embodiments of this disclosure exists in that for a migrated or to-be-migrated IAB-node, the child node and/or terminal equipment under the IAB-node is/are enabled to apply the configuration in the second reconfiguration message, so as to perform reconfiguration, and perform correct communication with the IAB-donor.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
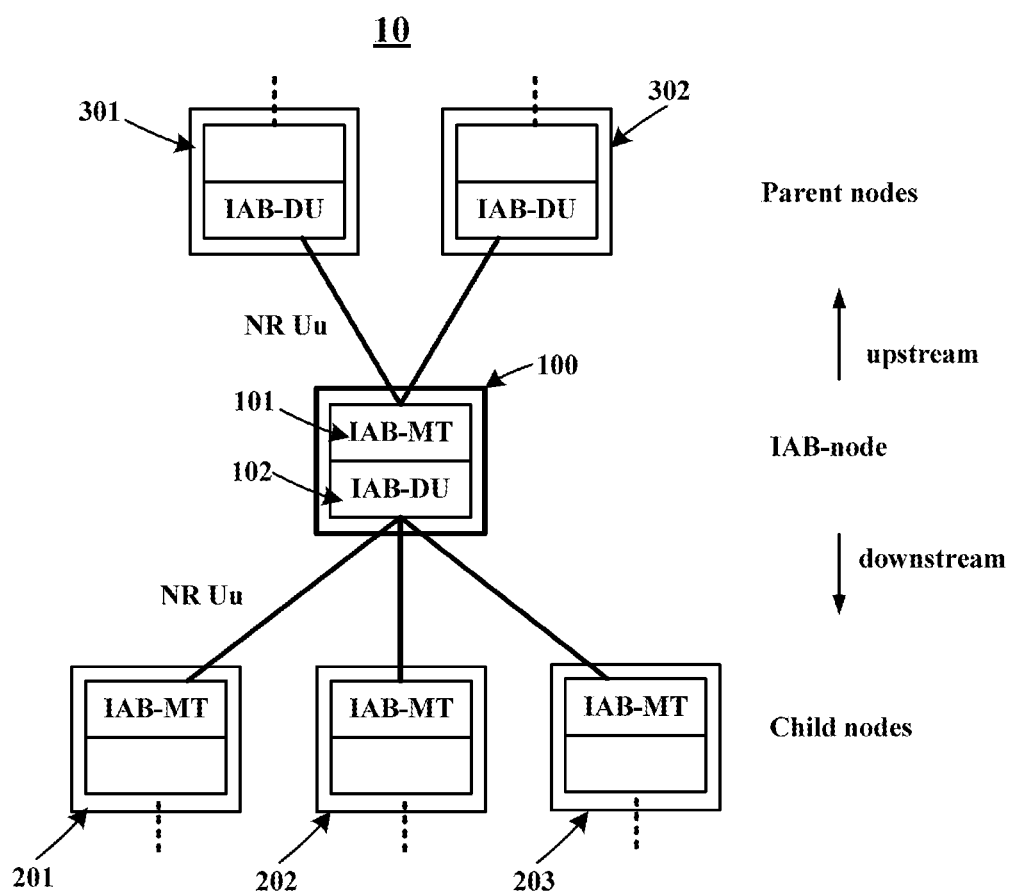
FIG. 1 is a schematic diagram of an IAB topology.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "radio communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node in an IAB architecture (IAB-node), a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a radio modem, a radio communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above.

In the following description, without causing confusion, the terms "uplink control signal" and "uplink control information (UCI)" or "physical uplink control channel (PUCCH)" are interchangeable, and terms "uplink data signal" and "uplink data information" or "physical uplink shared channel (PUSCH)" are interchangeable.

The terms "downlink control signal" and "downlink control information (DCI)" or "physical downlink control channel (PDCCH)" are interchangeable, and the terms "downlink data signal" and "downlink data information" or "physical downlink shared channel (PDSCH)" are interchangeable.

In addition, transmitting or receiving a PUSCH may be understood as transmitting or receiving uplink data carried by the PUSCH, transmitting or receiving a PUCCH may be understood as transmitting or receiving uplink information carried by the PUCCH, transmitting or receiving a PRACH may be understood as transmitting or receiving a preamble carried by the PRACH. An uplink signal may include an uplink data signal and/or an uplink control signal, etc., which may also be referred to as uplink information or an uplink channel. Transmitting uplink transmission on an uplink resource may be understood as transmitting the uplink transmission by using the uplink resource. Likewise, downlink data/signal/channel/information may be understood in a corresponding way.

In the embodiment of this disclosure, higher-layer signaling may be, for example, radio resource control (RRC) signaling, such as being referred to as an RRC message, and including an MIB, system information, and a dedicated RRC message; or being referred to as an RRC information element (RRC IE). The higher-layer signaling may also be, for example, media access control (MAC) signaling, or may be referred to as an MAC control element (MAC CE). However, this disclosure is not limited thereto.

It is agreed in 3GPP that during a process of migration of and IAB-node, it is assumed that all parent-child relationships are reserved at a new IAB-donor. For an IAB-MT, the conditional handover (CHO) introduced in Rel-16 should also be supported, except otherwise specified.

According to the assumption that all parent-child relationships are reserved at the new IAB-donor, a network topology of a migrated IAB-node and a terminal equipment (UE) or next level IAB-node (a descendant IAB-node or downstream IAB-node or child IAB-node, etc.) served thereby remain unchanged before and after the migration. In this case, the UE/descent IAB-node may possibly need to update a security key due to a change in the IAB-donor CU.

For any IAB-node, similar to a normal UE, CHO or conditional reconfiguration will be beneficial to improvement of robustness of inter-IAB-donor migration of an IAB-node. In addition, when an IAB-node triggers migration from a parent IAB-node to another parent IAB-donor under a different IAB-node, the migrated IAB-node is no longer able to receive a data packet for its UEs or child IAB-nodes, including a handover command (or RRC configuration carrying configuration with sync) or RRC reconfiguration, hence, these child IAB-nodes may trigger migration by using CHO. Otherwise, the migrated IAB-node may possibly need to wait for complete of migration of its UEs or child IAB-nodes before performing the migration, which will take a long time and may increase a risk of handover failure due to too late handover.

During a regular handover process, when a UE receives an RRC configuration (carrying configuration with sync) message, it starts to perform the handover process. In the CHO in Rel-16, the network configures the UE with conditions (CondExecutionCond) corresponding to one or more candidate target cells (SpCells) and their corresponding conditional RRC reconfigurations (condRRCReconfig) in the conditional reconfiguration. The UE evaluates a condition corresponding to a configured candidate target cell. If a condition (i.e. a measurement event) corresponding to a target candidate cell is satisfied, the UE initiates a conditional reconfiguration to the cell, and applies the conditional reconfiguration associated with the cell.

The RRC configuration message of the conditional handover or reconfiguration includes a ConditionalReconfiguration IE, which includes a CondReconfigToAddModList (conditional reconfiguration to addition modification list) IE, which includes one or more CondReconfigToAddMods (conditional reconfiguration to addition modifications), as shown in Table 1 below.

TABLE 1

```
CondReconfigToAddModList-r16 ::= SEQUENCE (SIZE (1..
maxNrofCondCells-r16)) OF CondReconfigToAddMod-r16
CondReconfigToAddMod-r16 ::=         SEQUENCE {
    condReconfigId-r16               CondReconfigId-r16,
    condExecutionCond-r16            SEQUENCE (SIZE (1..2)) OF
MeasId                               OPTIONAL,   -- Cond condReconfigAdd
    condRRCReconfig-r16              OCTET STRING (CONTAINING
RRCReconfiguration)                  OPTIONAL,   -- Cond condReconfigAdd
    ...
}
```

A CondReconfigToAddMod IE includes a condReconfigId (a conditional reconfiguration ID), a condExecutionCond (a condition) and a condRRCReconfig (conditional RRC reconfiguration), wherein condRRCReconfig contains related information of a target candidate cell, such as a physical cell ID (PCI), and a frequency, etc.

Scenarios of the embodiments of this disclosure shall be described below by way of example; however, this disclosure is not limited thereto.

Figure 2:
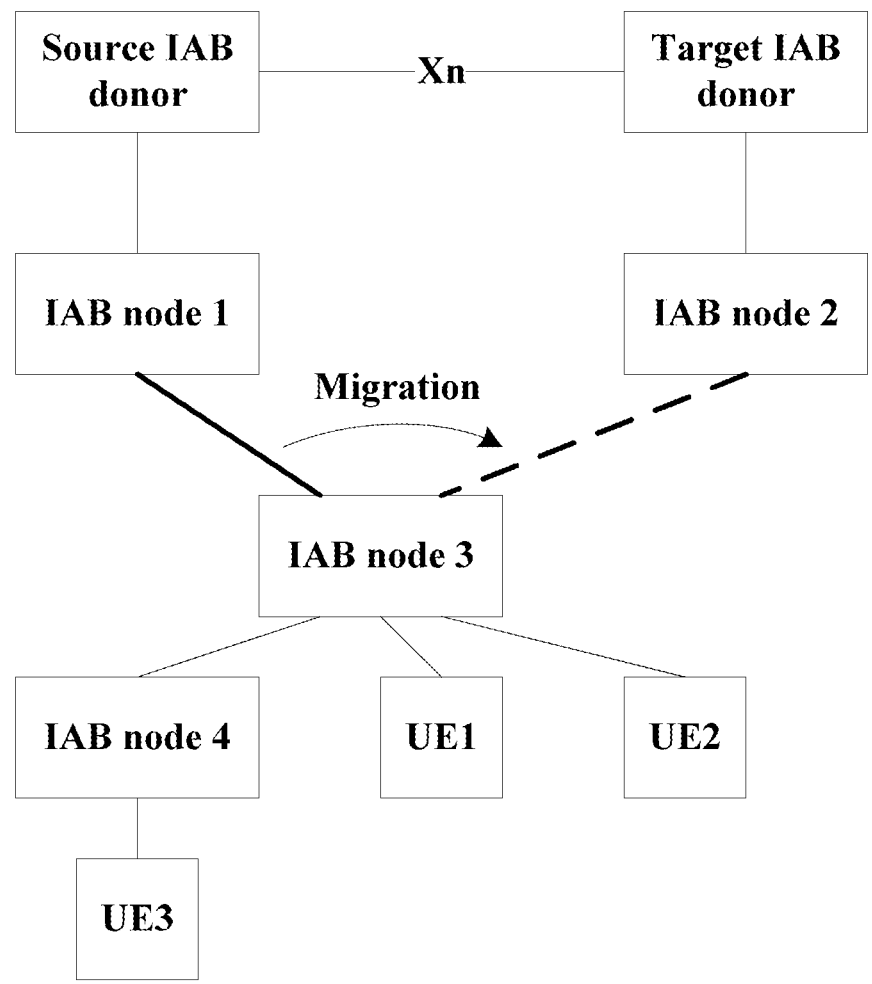
FIG. 2 is a schematic diagram of a communication system of an embodiment of this disclosure.

FIG. 2 is a schematic diagram of a communication system of an embodiment of this disclosure, schematically illustrating a case of migration of an IAB-node in an IAB topology. As shown in FIG. 2, IAB-node 3 is initially connected to IAB-node 1 and a source IAB-donor. For a purpose such as load balancing, it is needed to migrate IAB-node 3 to IAB-node 2 (that is, a parent node of IAB-node 3 is changed from IAB-node 1 to IAB-node 2), IAB-node 2 is connected to a target IAB-donor, which is a different central unit (CU) from the source IAB-donor. The process of migration of IAB-node 3 may use handover (or RRC configuration with sync), or conditional handover (CHO), or other reconfigurations. In addition, communication between the source IAB-donor and the target IAB-donor may be performed via an Xn interface.

In the migration shown in FIG. 2, the source IAB-donor and target IAB-donor of IAB-node 3 are different before and after migration, hence, the migration is inter-CU migration.

In scenarios of the embodiments of this disclosure, it may also be intra-CU migration, such as the case shown in FIG. 2 where IAB-node 2 and IAB-node 1 are both child nodes of the source IAB-donor.

Embodiment of a First Aspect

In some cases, when an IAB-node is migrated from a parent node to another, if reconfiguration on child nodes and/or terminal equipments under the IAB-node cannot be timely performed, communication between these child nodes and/or terminal equipments and an IAB-donor or IAB-CU will be affected.

For example, in the scenario of inter-CU migration shown in FIG. 2, when IAB-node 3 is migrated to the target IAB-donor, a physical cell ID (PCI) and frequency of the cell served by IAB-node 3 may remain unchanged. If terminal equipments UE1, UE2 served by IAB-node 3 and IAB-node 4 are still covered by an original cell, a connection relationship between UE1, UE2, IAB-node 4 and IAB-node 3 and connection relationship between UE3 and IAB-node 4 may remain unchanged. If the network has configured CHO for UE1, UE2, UE3 and IAB-node 4, even if IAB-node 3 is migrated, the measurement event included in the conditional reconfiguration for UE1, UE2, UE3 and IAB-node 4 may not be satisfied (because quality of a current serving cell may vary slightly, or no neighboring cell may satisfy the measurement event), and UE1, UE2, UE3 and IAB-node 4 will not initiate a handover or reconfiguration process to perform such operations as updating keys. Therefore, UE1, UE2, UE3, and IAB-node 4 may fail in communicating with a new CU (located at the target IAB-donor).

For another example, in some intra-CU migration scenarios, UE1, UE2 and UE3 under IAB-node 3 and IAB-node 4 may also be unable to communicate correctly with the CU due to the migration of IAB-node 3. For example, the CU has updated configuration of UE1, UE2 and UE3 or a PDCP layer of IAB-node 4, or has updated configuration of the DU of IAB-node 3. Therefore, it is also needed to make UE1, UE2, UE3 and IAB-node 4 initiate a handover or reconfiguration process to update the configuration, so as order to communicate correctly with the CU and/or IAB-node 3.

At least directed to this problem, the embodiment of this disclosure provides a method for receiving and transmitting signals.

The method for receiving and transmitting signals of the embodiment of the first aspect of this disclosure shall be described below from a side of IAB-node 3 in FIG. 2 by taking the inter-CU migration scenario in FIG. 2 as an example. It should be noted that the method for receiving and transmitting signals in the embodiment of the first aspect of this disclosure is not limited to the inter-CU migration scenario, and is also applicable to intra-CU migration scenarios.

Figure 3:
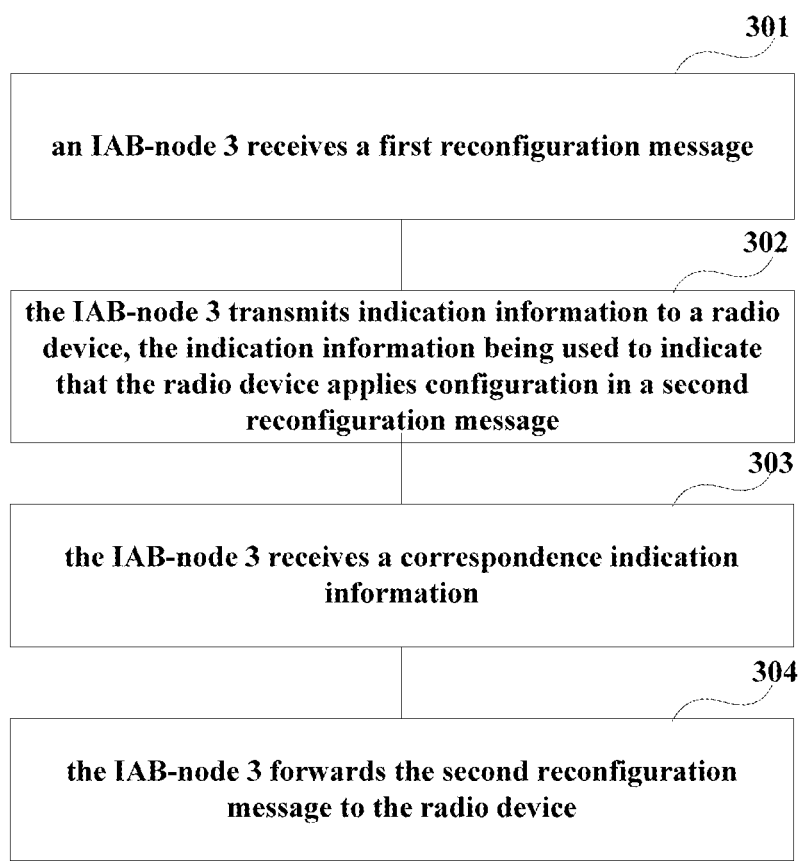
FIG. 3 is a schematic diagram of the method for receiving and transmitting signals of an embodiment of a first aspect of this disclosure.

FIG. 3 is a schematic diagram of the method for receiving and transmitting signals of the embodiment of this disclosure. As shown in FIG. 3, the method includes:

operation 301: an integrated access and backhaul node (i.e. IAB-node 3) receives a first reconfiguration message; and operation 302: the integrated access and backhaul node transmits indication information to a radio device, the indication information being used to indicate that the radio device applies configuration in a second reconfiguration message.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3. For example, operation 301 may be executed after operation 302.

According to the embodiment of the first aspect of this disclosure, the IAB-node receives the first reconfiguration message and transmits indication information to the radio device, so that the radio device applies the configuration in the second reconfiguration message. Hence, the radio device is able to perform handover or reconfiguration.

In at least one embodiment, the integrated access and backhaul node (i.e. IAB-node 3) in operation 301 may be a migrated IAB-node, or an IAB-node that is reconfigured (for example, relevant parameters of the IAB-node are reconfigured, or migration may not be performed), or an IAB-node of a CU with changed connection, or an IAB-node that is configured with respect to security (for example, a security key is updated, etc.). Here, the IAB-node may be an IAB-MT.

In at least one embodiment, the first reconfiguration message in operation 301 may be a reconfiguration message received from the source IAB-donor by IAB-node 1, the parent node of IAB-node 3, and forwarded to IAB-node 3. For example, the first reconfiguration message is a radio resource control reconfiguration (RRC reconfiguration) message, in which configuration with sync may or may not be carried, or, the radio resource control reconfiguration (RRC reconfiguration) message includes conditional reconfiguration or CHO. When the RRC reconfiguration message carries the configuration with sync, IAB-node 3 executes a process of handover or migration to a target cell, and when the RRC reconfiguration message does not carry the configuration with sync, IAB-node 3 executes a reconfiguration process. When the RRC reconfiguration message includes the conditional reconfiguration or CHO, IAB-node 3 evaluates whether a specific condition is satisfied, and executes conditional reconfiguration or CHO to a corresponding target cell if the condition is satisfied. When the RRC reconfiguration message includes security information (such as key configuration), IAB-node 3 performs security-related configuration. In addition, it should be noted that in at least one embodiment, when IAB-node 3 shown in FIG. 2 receives the first reconfiguration message, IAB-node 3 may finally complete the migration, or may not complete the migration.

In at least one embodiment, the radio device in operation 302 may be a terminal equipment served by IAB-node 3. For example, the radio device may be UE1 or UE2 served by IAB-node 3 in FIG. 2, or a next-level integrated access and backhaul node of IAB-node 3, or a downlink (downstream) IAB-node or child IAB-node. For example, the radio device may be downstream IAB-node 4 of IAB-node 3 in FIG. 2.

The second reconfiguration message may be a radio resource control (RRC) reconfiguration message, such as a conditional RRC reconfiguration message. In operation 302, an occasion of transmitting the indication information by IAB-node 3 to the radio device is one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARD) feedback message.

In at least some embodiments, the indication information transmitted in operation 302 enables or disables the radio device to: apply the configuration in the second reconfiguration message, or initiate the execution of conditional reconfiguration, or perform migration, or change the CU.

Taking that IAB-node 3 performs the inter-CU migration as an example, before the migration of IAB-node 3, the source IAB-donor or source CU may transmit a handover request message to the target IAB-donor or target CU, the handover request message carrying, for example, contexts of all terminal equipments, contexts of all IAB-MTs, contexts of all IAB-DUs, information on backhaul and topology, and IP address information, etc. The contexts of the terminal equipments may include such information as physical cell IDs (PCIs) of source cells where the terminal equipments (such as UE1 and UE2) are located, and the contexts of the IAB-MTs may include such information as a physical cell ID (PCI) of a source cell where the IAB-node (such as IAB-node 4) is located. After receiving the handover request, the target IAB-donor or target CU transmits a handover request acknowledgement message to the source IAB-donor or source CU, the handover request acknowledgement message including configuration corresponding to the PCI of the source cell of the terminal equipment and/or configuration corresponding to the PCI of the source cell of the IAB-node. After receiving the configuration, the source IAB-donor or source CU may set a condition corresponding to the cell, and include the condition and configuration corresponding to the cell in the second reconfiguration message transmitted to the radio device (i.e. a current radio device, UE1, or UE2, or IAB-node 4).

In at least some embodiments, in the second reconfiguration message (such as in ServingCellConfigCommon included in reconfigurationWithSync), a target candidate cell with the same ID as a UE served by IAB-node 3 or a cell of a downlink IAB-node (i.e. a cell serving for the current radio device, UE1, or UE2, or UE3, or IAB-node 4) is configured once or appears once. For example, the ID may be a PCI or a cell ID or a cell global ID (CGI) or an E-UTRAN cell global identifier (ECGI), etc. Therefore, the indication information enables the radio device to apply the configuration of the target candidate cell with the same ID as the current serving cell in the second reconfiguration message.

For example, after receiving the indication information transmitted by IAB-node 3, the radio device (such as UE1, or UE2, or UE3, or IAB-node 4) initiates conditional reconfiguration, and the applied condRRCReconfig is condRRCReconfig to which the PCI of the current serving cell of IAB-node 3 corresponds, that is, a physical cell ID (PCI) indicated in ServingCellConfigCommon included in reconfigurationWithSync in the RRC configuration message is the condRRCReconfig of the physical cell ID of the current serving cell.

In addition, this disclosure may not be limited thereto, and in at least some embodiments, in the second reconfiguration message (such as in ServingCellConfigCommon included in reconfigurationWithSync), a target candidate cell with the same ID as the cell of IAB-node 3 serving for the UE or the cell of the downlink IAB-node (i.e. the cell serving for the current radio device, UE1, or UE2, or IAB-node 4) is configured more than twice (i.e. appears more than twice) or is not configured (i.e. does not appear).

In at least some other embodiments, the indication information in operation 302 indicates information of a central unit (CU). The central unit is a central unit to which IAB-node 3 is to be connected or has been connected based on the first reconfiguration message. For example, in the case of inter-CU migration, the central unit may be the CU of the target IAB-donor in FIG. 2.

The information of the central unit includes at least one of the following: an ID of the central unit; an index of the central unit; at least a part of an Internet Protocol (IP) address and/or network device ID (gNB ID) of the central unit (e.g., a most significant bit MSB or a least significant bit LSB); a cell identity of the central unit or at least a part of the cell identity (such as a most significant bit MSB of the cell identity); at least a part of a public land mobile network identity information (PLMN-IdentityInfo) of the central unit; at least a part of common gateway interface (CGI).

In at least some other embodiments, the second reconfiguration message may include the information of the central unit and configuration corresponding to the information of the central unit. Therefore, when the radio device (such as UE1, or UE2, or IAB-node 4) receives the indication information transmitted by IAB-node 3 and the second reconfiguration message, it may use configuration corresponding to the information of the central unit in the indication information according to the information of the central unit in the indication information and apply the configuration.

In at least some other embodiments, the indication information may indicate the configuration applied by the radio device (e.g. condRRCReconfig).

In addition, as the RRC function is in the IAB-node CU and the IAB-node does not have the RRC function, migrated IAB-node 3 is unable to resolve the configuration in the second reconfiguration message received by the radio device under IAB-node 3 (such as UE1, or UE2, or UE3, or IAB-node 4). Therefore, IAB-node 3 may determine the configuration applied by the radio device (such as condRRCReconfig) via a correspondence indication information, and then indicate the determined configuration to the radio device.

As shown in FIG. 3, the method for receiving and transmitting signals may further include:

operation 303: the IAB-node 3 receives a correspondence indication information.

For example, the correspondence indication information in operation 303 is used to indicate:

a correspondence between identification information (such as CondReconfigId, or MeasId, etc.) of the configuration in the second reconfiguration message and identification information (such as a PCI of a target cell) of a target cell in the first reconfiguration message; or, a correspondence between identification information (such as CondReconfigId, or MeasId, etc.) of the configuration in the second reconfiguration message (such as conditional RRC reconfiguration) and identification information (such as CondReconfigId, or MeasId, etc.) of configuration in the first reconfiguration message.

For example, the correspondence indication information in operation 303 is used to indicate:

a correspondence between a target cell (or a target candidate cell) and identification information (such as CondReconfigId, or MeasId, etc.) of the configuration included in the second reconfiguration message or the configuration (such as condRRCReconfig) included in the second reconfiguration message, IAB-node 3 may receive an F1-C message (such as a UE context modification request), the F1-C message including the correspondence indication information.

It should be noted that an order of operations 301, 302 and 303 may not be limited to that shown in FIG. 3. For example, operation 303 may also be before operation 301 or 302; or, operation 303 may also be included in operation 301, that is, IAB-node 3 receives the first reconfiguration message and the correspondence indication information simultaneously.

In the embodiment of the first aspect of this disclosure, IAB-node 3 may transmit indication information to the radio device (such as UE1, or UE2, or UE3, or IAB-node 4) via a backhaul adaptive protocol data unit (BAP PDU), or a radio link layer control protocol data unit (RLC PDU), or a media access control element (MAC CE), or a media access control (MAC) subheader, or physical layer signaling.

In some embodiments, a new backhaul adaptive control protocol data unit (BAP control PDU) may be defined to transmit the indication information. For example, the BAP control PDU may use a new PDU type to identify that it is used to transmit the indication information, and/or the BAP control PDU may contain information of a CU of 8 bits, or 16 bits, or 24 bits.

For example, a format of the BAP control PDU may be as shown in Table 2 below. In Table 2, a D/C field is of 1 bit, indicating whether a corresponding BAP PDU is a BAP data PDU or a BAP control PDU, a PDU type is, for example, of 3 bits, indicating a type of control information included in the BAP control PDU, and R is a reserved bit.

TABLE 2

| D/C | PDU type | R | R | R |
|-----|----------|---|---|---|

For another example, the format of the BAP control PDU may also be as shown in Table 3 below. In Table 3, in addition to the fields shown in Table 2, the BAP control PDU further includes the information on the CU, such as a CU ID. The CU ID shown in Table 3 is of 8 bits. In addition, the CU ID may also be of 16 bits or 24 bits.

TABLE 3

| D/C | PDU type | R | R | R |
|-----|----------|---|---|---|
| | CU ID | | | |

In some embodiments, a new radio link layer control control protocol data unit (RLC control PDU) may be defined to transmit the indication information. For example, the RLC control PDU may use a new control PDU type (CPT) to identify that it is used to transmit the indication information, and/or the BAP control PDU may contain information of a CU of 8 bits, or 16 bits, or 24 bits.

In some embodiments, a new media access control element (MAC CE) may be defined to transmit the indication information. The MAC CE may correspond to a new logical channel identifier (LCID) in a subheader. For example, in a case where the indication information includes information of the CU, the MAC CE may contain information of a CU of 8 bits, or 16 bits, or 24 bits, and the MAC CE may also be of 8 bits or 16 bits or 24 bits in length.

In some embodiments, a media access control (MAC) subheader may have a new LCID that may be used to transmit the indication information. For example, when the indication information is used to indicate that the radio device enables the configuration in the second reconfiguration, the radio device receives the MAC subheader containing the LCID, and the configuration in the second reconfiguration is applied.

In some embodiments, the physical layer signaling may be a domain in downlink control information (DCI), the domain in the DCI being used to transmit the indication information. The domain in DCI may be, for example, group common DCI, common DCI, or UE-specific DCI), etc. For example, when the indication information is used to indicate that the radio device enables the configuration in the second reconfiguration, a domain of 1 bit may be added to the DCI to transmit the indication information. In addition, the DCI may also be paging DCI, etc.

In the embodiment of the first aspect of this disclosure, as shown in FIG. 3, the method for receiving and transmitting signals may further include:

operation 304: the integrated access and backhaul node further forwards the second reconfiguration message to the radio device.

For example, IAB-node 3 may receive the second reconfiguration message from the source IAB-donor, and forward the second reconfiguration message to the radio device (such as UE1, or UE2, or UE3, or IAB-node 4).

It should be noted that an order of operations 301, 302, 303 and 304 may not be limited to that shown in FIG. 3. For example, operation 304 may also be before operation 301 or operation 302 or operation 303; or, operation 304 may also be included in operation 301 or operation 303.

Figure 4:
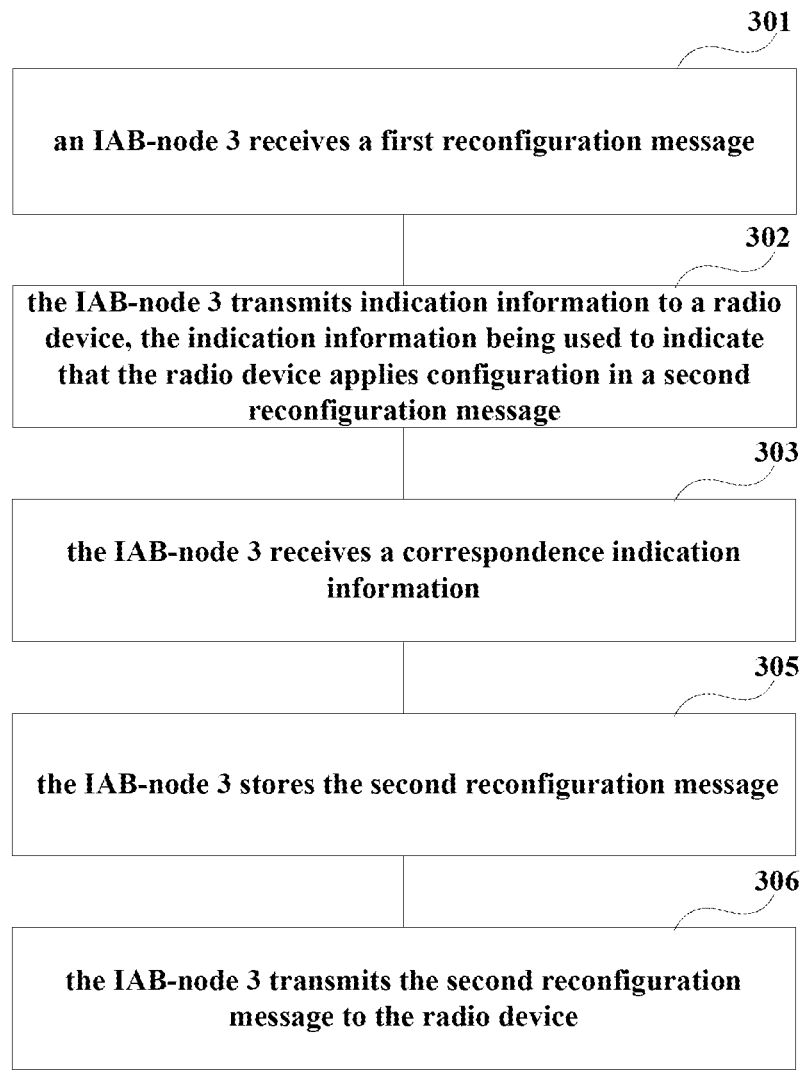
FIG. 4 is another schematic diagram of the method for receiving and transmitting signals of this disclosure.

FIG. 4 is another schematic diagram of the method for receiving and transmitting signals of this disclosure. A difference between the method shown in FIG. 4 and the method shown in FIG. 3 is that FIG. 4 does not include operation 304, but rather include operation 305 and an operation 306.

Operation 305: the integrated access and backhaul node stores the second reconfiguration message; and operation 306: the integrated access and backhaul node transmits the second reconfiguration message to the radio device.

It should be noted that an order of operations 301, 302, 303, 305 and 306 may not be limited to that shown in FIG. 4. For example, operations 305 and 306 may also be before operation 301 or operation 302 or operation 303; or, operation 305 may also be before operation 301 or operation 302, and operation 306 may be included in operation 302.

In operation 306, an occasion of transmitting the second reconfiguration message by IAB-node 3 to the radio device may be one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARM) feedback message.

In the method shown in FIG. 4, an occasion of transmitting the second reconfiguration message to the radio device by IAB-node 3 may be identical to an occasion of transmitting the indication information to the radio device by IAB-node 3, that is, IAB-node 3 transmits the second reconfiguration message and the indication information to the radio device simultaneously, or includes the second reconfiguration message and the indication information in a message. Hence, transmission resources may be saved.

In addition, in the method shown in FIG. 4, the occasion of transmitting the second reconfiguration message to the radio device by IAB-node 3 may be different from the occasion of transmitting the indication information to the radio device by IAB-node 3. Hence, occasions of transmission are relatively flexible.

Figure 5:
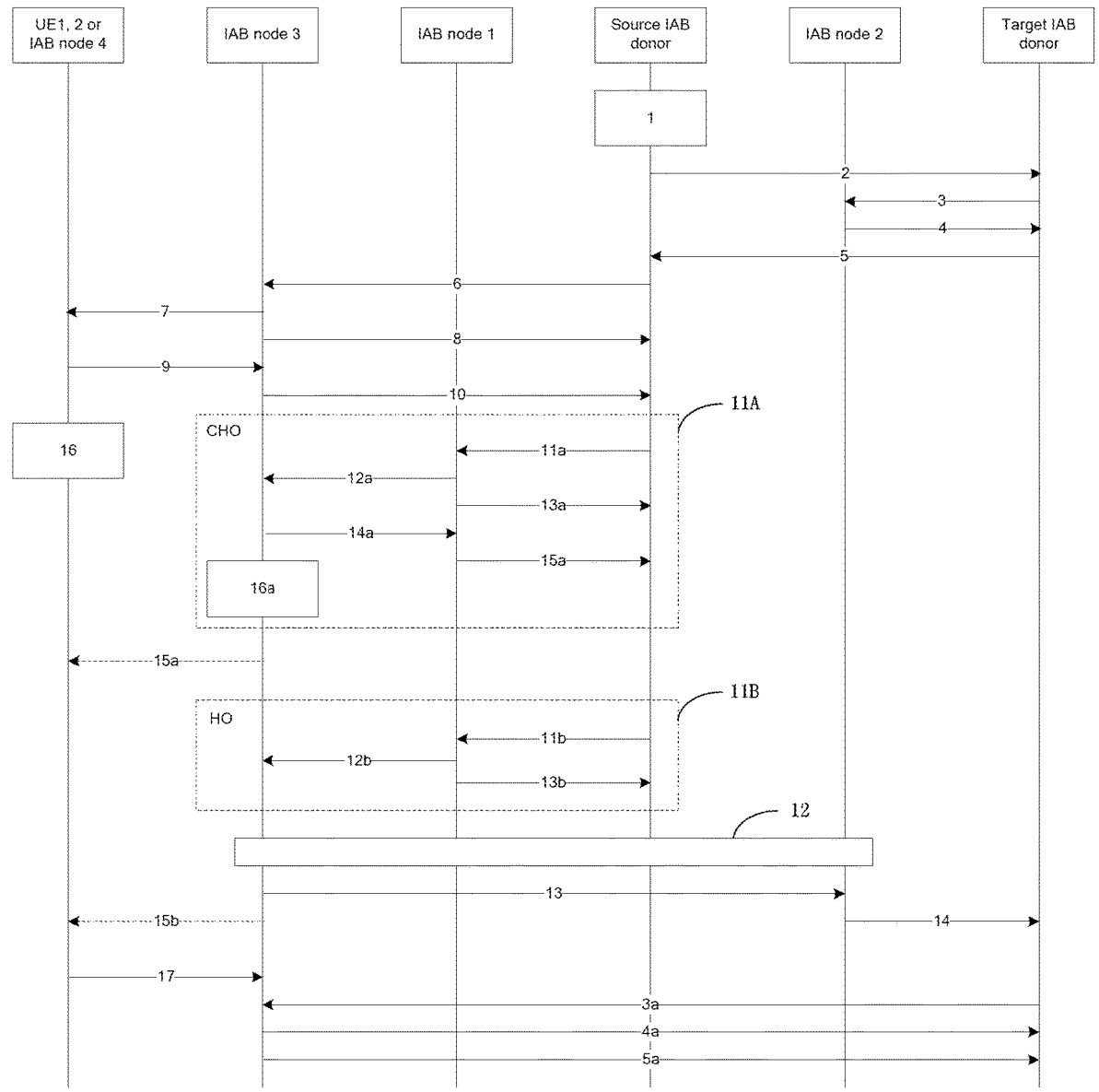
FIG. 5 is a flowchart of performing inter-CU migration by IAB-node 3.

FIG. 5 is a flowchart of performing inter-CU migration by IAB-node 3. As shown in FIG. 5, the process includes the following operations:

1. The source IAB donor makes a CHO decision on UE1, UE2 and/or IAB-node 4, and makes a migration decision on IAB-node 3. For example, a CHO or handover process may be used to prepare for migrating IAB-node 3 and the UE and/or IAB-node (IAB-MT) served thereby to the target IAB donor;
2. The source IAB donor transmits a handover request to the target IAB donor;
3. The target IAB donor transmits a request to the target parent node of IAB-node 3, IAB-node 2, the request being, for example, a UE context setup request (UE context setup req);
4. IAB-node 2 transmits a response to the request in operation 3, such as a UE context setup response (UE context setup resp);
5. The target IAB donor transmits a handover request acknowledgement message to the source IAB donor, such as handover request acknowledge;
6. The source IAB donor transmits a request to IAB-node 3, the request being, for example, a UE context modification request (UE context modification req), and the request including the second configuration information, such as RRC Reconfiguration;
7. IAB-node 3 forwards the second configuration information (such as RRC Reconfiguration) to the radio device (such as UE1, or UE2, or IAB-node 4), operation 7 corresponding to operation 304 in FIG. 3;
8. IAB-node 3 transmits a response to the source IAB donor, such as a UE context modification response (UE context modification resp);
9. The radio device (such as UE1, or UE2, or IAB-node 4) transmits a second configuration complete message to IAB-node 3, such as RRC configuration complete; and
10. IAB-node 3 transmits an uplink radio resource control message transfer message to the source IAB donor, such as UL RRC Message Transfer.

In the process shown in FIG. 5, IAB-node 3 may perform conditional handover (CHO) shown in 11A or handover (HO) shown in 11B.

As shown in FIG. 5, the conditional handover (CHO) shown in 11A includes the following operations:

11a. The source IAB donor transmits a request to source parent node of IAB-node 3, IAB-node 1, such as UE context modification req;
12a. IAB-node 1 transmits first configuration information to IAB-node 3, the first configuration information being, for example, RRC Reconfiguration;
13a. IAB-node 1 transmits a response to the source IAB donor, the response being, for example, a UE context modification response (UE context modification resp);
14a. IAB-node 3 transmits a first configuration information reception complete response to IAB-node 1, the first configuration complete message being, for example, RRC configuration complete;
15a. IAB-node 1 transmits an uplink radio resource control message transfer message (UL RRC Message Transfer) to the source IAB donor; and
16a. IAB-node 3 evaluates a handover condition.

As shown in FIG. 5, the handover (HO) shown in 11B includes the following operations:

11b. The source IAB donor transmits a request to the source parent node of IAB-node 3, IAB-node 1, the request being, for example, a UE context modification request (UE context modification req);
12b. IAB-node 1 transmits first configuration information to IAB-node 3, the first configuration information being, for example, RRC Reconfiguration; and
13b. IAB-node 1 transmits a response to the source IAB donor, the response being, for example, a UE context modification response (UE context modification resp).

As shown in FIG. 5, the migration process further includes the following operations:

12. When a result of evaluating the handover condition in 16a of operation 11A is that the handover condition is satisfied, or when operation 11B is completed, in operation 12, IAB-node 3 is detached from the source IAB donor, applies the configuration in the first configuration information, and performs a procedure of random access to the target/new parent node (detach from source, apply the stored configuration, RACH);
13. IAB-node 3 transmits first configuration information configuration complete information to the new parent node, IAB-node 2, the first configuration information configuration complete information being, for example, RRC configuration complete;
14. IAB-node 2 transmits an uplink radio resource control message transfer message (UL RRC Message Transfer) to the target IAB-donor;
15a, 15b. IAB-node 3 may transmit the indication information to the radio device (such as UE1, or UE2, or IAB-node 4) at one of multiple occasions; for example, the occasion shown in 15a is an occasion of determining by IAB-node 3 that the measurement event related to the conditional reconfiguration is satisfied, and the occasion shown in 15b is an occasion of transmitting a reconfiguration complete message based on the first reconfiguration message by IAB-node 3, wherein the indication information enables or disables the radio device to apply the configuration in the second reconfiguration message, or the indication information indicates the information of the target IAB donor (target CU);
16. The radio device (such as UE1, or UE2, or IAB-node 4) evaluates an HO condition;
17. When the radio device (such as UE1, or UE2, or IAB-node 4) receives the indication information, it applies the configuration in the second configuration information, and after applying the configuration, transmits second configuration information configuration complete information to IAB-node 3, such as RRC configuration complete.

3a. The target IAB donor transmits a request to IAB-node 3, the request being, for example, a UE context setup request (UE context setup req);

4a. IAB-node 3 transmits a response to the request in operation 3a to the target IAB donor, the response being, for example, a UE context setup response (UE context setup resp);

5a. IAB-node 3 transmits an uplink radio resource control message transfer message (UL RRC Message Transfer) to the target IAB donor, the UL RRC Message Transfer including second configuration information configuration complete information for the radio device (such as UE1, or UE2, or IAB-node 4) (RRC reconfiguration complete for UE/descent IAB nodes).

Figure 6:
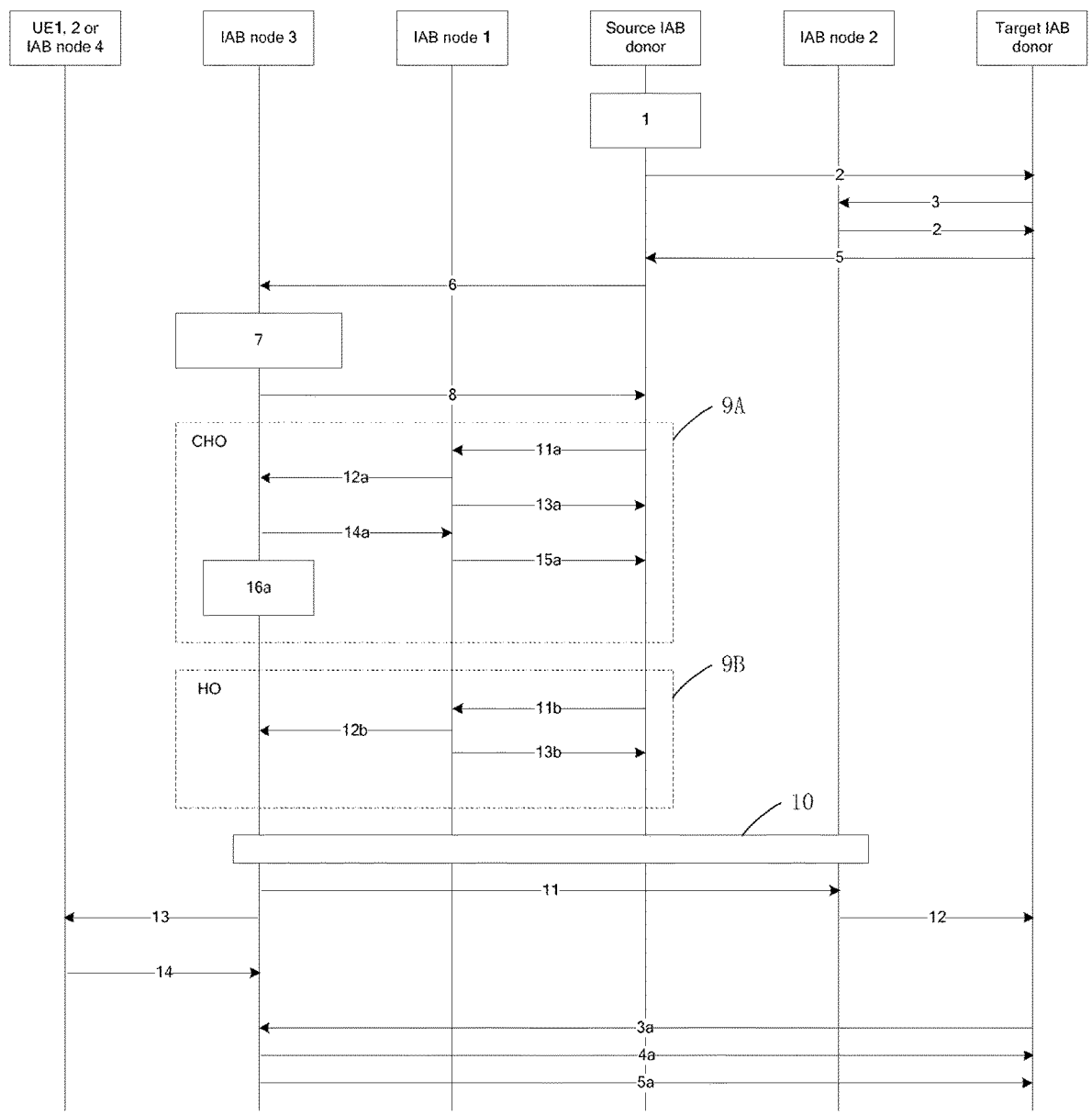
FIG. 6 is another flowchart of performing inter-CU migration by IAB-node 3.

FIG. 6 is another flowchart of performing inter-CU migration by IAB-node 3. As shown in FIG. 6, the process includes the following operations:

1. The source IAB donor makes a CHO decision on UE1, UE2 and/or IAB-node 4, and makes a migration decision on IAB-node 3. For example, a CHO or handover process may be used to prepare for migrating IAB-node 3 and the UE and/or IAB-node (IAB-MT) served thereby to the target IAB donor;
2. The source IAB donor transmits a handover request to the target IAB donor;
3. The target IAB donor transmits a request to the target parent node of IAB-node 3, IAB-node 2, the request being, for example, a UE context setup request (UE context setup req);
4. IAB-node 2 transmits a response to the request in operation 3, such as a UE context setup response (UE context setup resp);
5. The target IAB donor transmits a handover request acknowledgement message to the source IAB donor, such as handover request acknowledge;
6. The source IAB donor transmits a request to IAB-node 3, the request being, for example, a UE context modification request (UE context modification req), and the request including the second configuration information, such as RRC Reconfiguration;
7. The IAB-node stores the second configuration information, corresponding to operation 305 in FIG. 4;
8. IAB-node 3 transmits a response to the source IAB donor, such as a UE context modification response (UE context modification resp).

In the process shown in FIG. 6, IAB-node 3 may perform the conditional handover (CHO) shown in 9A or the handover (HO) shown in 9B. Explanations of the conditional handover (CHO) shown in 9A are identical to the explanations of the conditional handover (CHO) shown in 11A of FIG. 5, and the explanations of the handover (HO) shown in 9B are identical to the explanations of the handover (HO) shown in 11B of FIG. 5.

As shown in FIG. 6, the migration process further includes the following operations:

10. When the result of evaluating the handover condition in 16a of operation 9A is that the handover condition is satisfied, or when operation 9B is completed, in operation 10, IAB-node 3 is detached from the source IAB donor, applies the configuration in the first configuration information, and performs a procedure of random access to the target/new parent node (detach from source, apply the stored configuration, RACH);
11. IAB-node 3 transmits first configuration information configuration complete information to the new parent node, IAB-node 2, the first configuration information configuration complete information being, for example, RRC configuration complete;
12. IAB-node 2 transmits an uplink radio resource control message transfer message (UL RRC Message Transfer) to the target IAB-donor;
13. IAB-node 3 may transmit the indication information to the radio device (such as UE1, or UE2, or IAB-node 4) at one of multiple occasions; for example, the occasion of operation 13 shown in 6 is an occasion of transmitting the reconfiguration complete based on the first reconfiguration message by IAB-node 3 (i.e. operation 11 in FIG. 6), wherein the indication information enables or disables the radio device to apply the configuration in the second reconfiguration message, or the indication information indicates the information of the target IAB donor; and in the implementation shown in FIG. 6, IAB-node 3 further transmits the second configuration information (RRC Reconfiguration) in operation 13, corresponding to operation 306 in FIG. 4, that is, operation 13 in FIG. 6 corresponds to a combination of operation 306 and operation 302 in FIG. 4; in addition, this disclosure may not be limited thereto, for example, the second configuration information or the indication information may be transmitted at other occasions, or the indication information and the second configuration information may not be transmitted simultaneously;
14. In a case where the radio device (such as UE1, or UE2, or IAB-node 4) receives the indication information, it applies the configuration in the second configuration information, and after completing applying the configuration, transmits the second configuration information configuration complete information to IAB-node 3, such as RRC configuration complete.

In addition, the explanations of operations 3a, 4a and 5a in FIG. 6 are identical to the explanations of operations 3a, 4a and 5a in FIG. 5.

According to the embodiment of the first aspect of this disclosure, the radio device UE or IAB-node (such as UE1, or UE2, or IAB-node 4) under the migrated or to-be-migrated IAB-node (such as IAB-node 3) may also apply the configuration from the new IAB-node, such as security key-related configuration, so as to correctly communicate with the new IAB-node, and the complexity of the scheme is relatively low and has little impact on current standards. In addition, for scenarios of intra-CU migration, they may be processed by using the method of the embodiment of the first aspect of this disclosure, so that the radio device UE or IAB-node (such as UE1, or UE2, or IAB-node 4) under the migrated or to-be-migrated IAB-node (such as IAB-node 3) may apply the new configuration in a timely manner.

Embodiment of a Second Aspect

At least directed to the same problem as the embodiment of the first aspect, the embodiment of the second aspect of this disclosure provides a signal receiving method, corresponding to the method of the embodiment of the first aspect.

The signal receiving method of the embodiment of the second aspect of this disclosure shall be described below from a side of the radio device in FIG. 2 by taking the scenario of inter-CU migration in FIG. 2 as an example. It should be pointed out that the signal receiving method of the embodiment of the second aspect of this disclosure is not limited to the scenario of inter-CU migration, and the method is also applicable to a scenario of intra-CU migration, and reference may be made to FIG. 5 or 6 for a process of exchange between the radio device and IAB-node 3. The radio device includes a terminal equipment, such as UE1 and UE2; or, a next-level integrated access and backhaul node of IAB-node 3, IAB-node 4.

Figure 7:
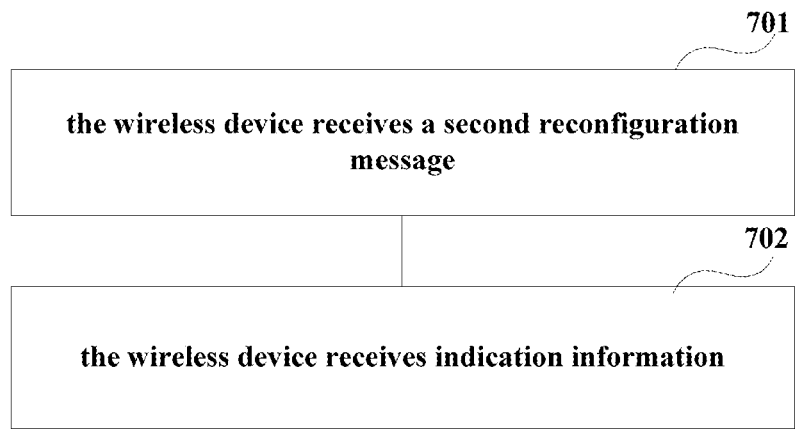
FIG. 7 is a schematic diagram of the signal receiving method in an embodiment of a second aspect.

FIG. 7 is a schematic diagram of the signal receiving method in the embodiment of the second aspect. As shown in FIG. 7, the method includes:

operation 701: the radio device receives a second reconfiguration message; and operation 702: the radio device receives indication information, the indication information being used to indicate that the radio device applies configuration in the second reconfiguration message in a radio resource control layer.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

An occasion of receiving by the radio device the indication information transmitted by IAB-node 3 is one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARM) feedback message.

In this disclosure, the radio device may receive the indication information via a backhaul adaptive protocol data unit (BAP PDU), or a radio link layer control protocol data unit (RLC PDU), or a media access control element (MAC CE), or a media access control (MAC) subheader, or physical layer signaling.

In at least some embodiments, the indication information enables or disables the radio device: to apply configuration in the second reconfiguration message in the radio resource control layer, or initiate execution of conditional reconfiguration, or perform migration, or change a CU, etc. In the second reconfiguration message, a target candidate cell with the same ID as a UE served by IAB-node 3 or a cell of a downlink IAB-node (i.e. a cell serving for the current radio device, UE1, or UE2, or UE3, or IAB-node 4) is configured once or appears once. For example, the ID may be a PCI or a cell ID or a cell global ID (CGI) or an E-UTRAN cell global identifier (ECGI), etc. The radio device applies configuration of a target candidate cell having the same identifier as a current serving cell in the second reconfiguration message in the radio resource control (RRC) layer.

In addition, this disclosure may not be limited thereto, and in at least some embodiments, in the second reconfiguration message (such as in ServingCellConfigCommon included in reconfigurationWithSync), a target candidate cell with the same ID as the cell of IAB-node 3 serving for the UE or the cell of the downlink IAB-node (i.e. the cell serving for the current radio device, UE1, or UE2, or IAB-node 4) is configured more than twice (i.e. appears more than twice) or is not configured (i.e. does not appear).

In at least some other embodiments, the indication information indicates information of a central unit (CU). The central unit is a central unit to which IAB-node 3 is to be connected or has been connected based on the first reconfiguration message, such as the target IAB donor in FIG. 2.

The information of the central unit includes at least one of the following: an ID of the central unit; an index of the central unit; at least a part of an Internet Protocol (IP) address and/or network device ID (gNB ID) of the central unit (e.g., a most significant bit MSB or a least significant bit LSB); a cell identity of the central unit or at least a part of the cell identity (such as a most significant bit MSB of the cell identity); at least a part of a public land mobile network identity information (PLMN-IdentityInfo) of the central unit; at least a part of common gateway interface (CGI).

In at least some other embodiments, the second reconfiguration message includes the information of the central unit and configuration corresponding to the information of the central unit, and the radio device determines the configuration in the second reconfiguration message corresponding to the information on the central unit according to the information on the central unit in the indication information, and applies the configuration at a radio resource control (RRC) layer of the radio device.

In at least some other embodiments, the indication information may indicate the configuration applied by the radio device (e.g. condRRCReconfig).

There exists a correspondence between identification information of the configuration in the second reconfiguration message (conditional RRC reconfiguration) and identification information of a target cell in the first reconfiguration message, or, there exists a correspondence between identification information of the configuration in the second reconfiguration message (conditional RRC reconfiguration) and identification information of configuration in the first reconfiguration message, or, there exists a correspondence between a target cell and identification information (CondReconfigId) of the configuration or the configuration (condRRCReconfig) included in the second reconfiguration message (conditional RRC reconfiguration).

In operation 701, the radio device receives the second reconfiguration information from the source IAB-donor forwarded by IAB-node 3.

In operation 701, in some other embodiments, IAB-node 3 receives and stores the second reconfiguration information from the source IAB-donor, and transmits the second reconfiguration information to the radio device at an appropriate occasion.

An occasion of receiving by the radio device the second reconfiguration message transmitted by IAB-node 3 is one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent IAB-node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent IAB-node or a target parent IAB-node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARM) feedback message.

In some embodiments, the radio device simultaneously receives the second reconfiguration message and the indication information from IAB-node 3. In addition, the radio device may also not receive the second reconfiguration message and the indication information simultaneously.

According to the embodiment of the second aspect of this disclosure, the radio device UE or IAB-node (such as UE1, or UE2, or IAB-node 4) under the migrated or to-be-migrated IAB-node (such as IAB-node 3) may also apply at the RRC layer the configuration in the second reconfiguration information, such as security key-related configuration, so as to correctly communicate with the new IAB-node, and the complexity of the scheme is relatively low and has little impact on current standards. In addition, for scenarios of intra-CU migration, the method of the embodiment of the second aspect of this disclosure is also applicable, so that the radio device UE or IAB-node (such as UE1, or UE2, or IAB-node 4) under the migrated or to-be-migrated IAB-node (such as IAB-node 3) may apply the new configuration in a timely manner.

Embodiment of a Third Aspect

At least directed to the same problem as the embodiment of the first aspect, the embodiment of the second aspect of this disclosure provides a method for transmitting a signal, corresponding to the method of the embodiment of the first aspect.

The method for transmitting a signal of the embodiment of the third aspect of this disclosure shall be described below from a side of the source central unit (source IAB-donor) in FIG. 2 by taking the scenario of inter-CU migration in FIG. 2 as an example. It should be pointed out that the method for transmitting a signal of the embodiment of the third aspect of this disclosure is not limited to the scenario of inter-CU migration, and the method is also applicable to a scenario of intra-CU migration, and reference may be made to FIG. 5 or 6 for a process of exchange between the source IAB-donor and IAB-node 3.

Figure 8:
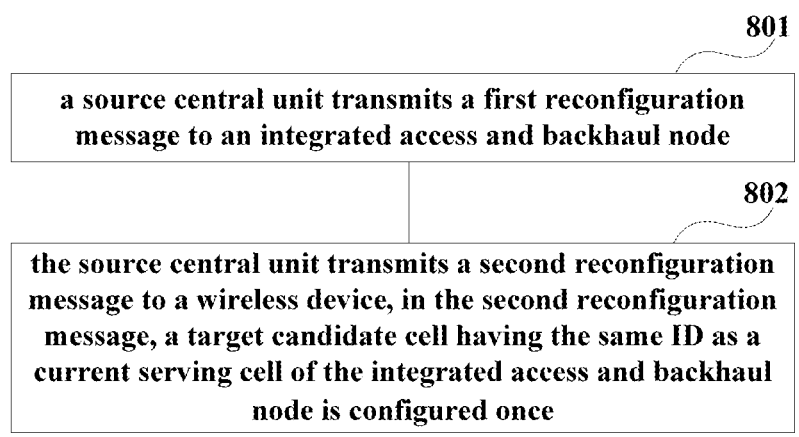
FIG. 8 is a schematic diagram of the method for transmitting a signal in an embodiment of a third aspect.

FIG. 8 is a schematic diagram of the method for transmitting a signal in the embodiment of the third aspect. As shown in FIG. 8, the method includes:

operation 801: a source central unit transmits a first reconfiguration message to an integrated access and backhaul node; and operation 802: the source central unit transmits a second reconfiguration message to a radio device, in the second reconfiguration message, a target candidate cell having the same ID as a current serving cell of the integrated access and backhaul node is configured once.

Figure 9:
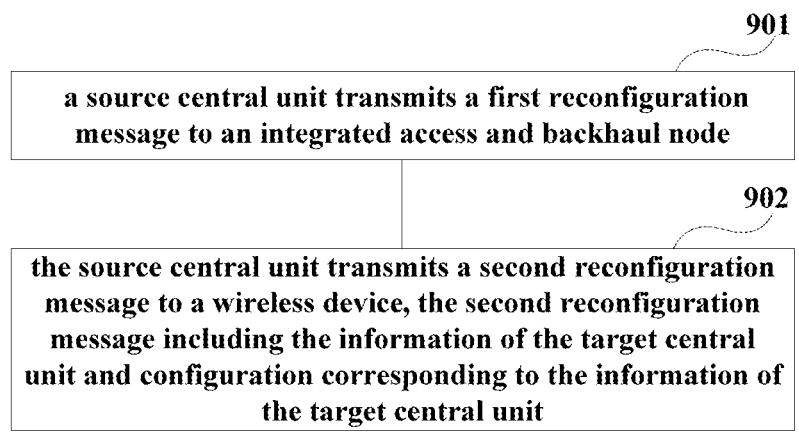
FIG. 9 is another schematic diagram of the method for transmitting a signal in the embodiment of the third aspect.

FIG. 9 is another schematic diagram of the method for transmitting a signal in the embodiment of the third aspect. As shown in FIG. 9, the method includes:

operation 901: a source central unit transmits a first reconfiguration message to an integrated access and backhaul node; and operation 902: the source central unit transmits a second reconfiguration message to a radio device, the second reconfiguration message including the information of the target central unit and configuration corresponding to the information of the target central unit.

Figure 10:
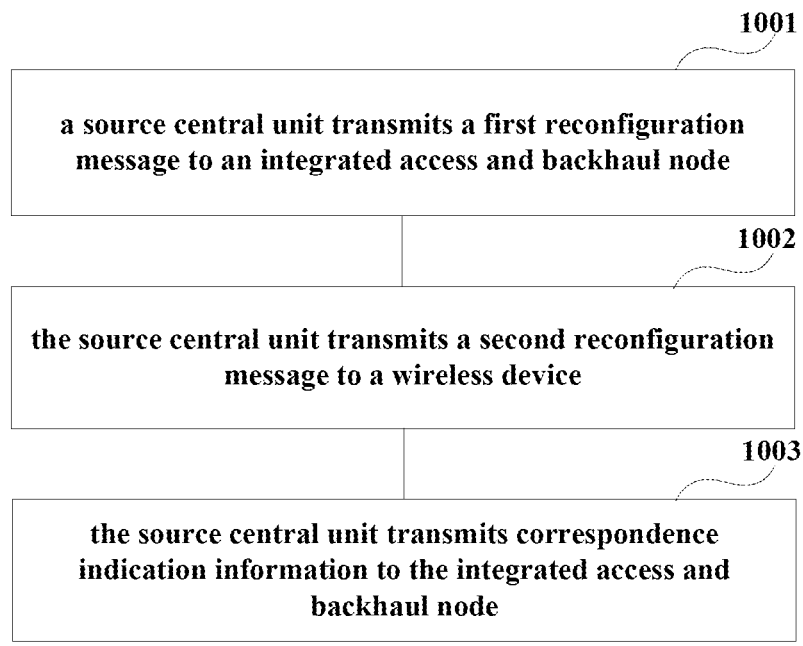
FIG. 10 is a further schematic diagram of the method for transmitting a signal in the embodiment of the third aspect.

FIG. 10 is a further schematic diagram of the method for transmitting a signal in the embodiment of the third aspect. As shown in FIG. 10, the method includes:

operation 1001: a source central unit transmits a first reconfiguration message to an integrated access and backhaul node;

operation 1002: the source central unit transmits a second reconfiguration message to a radio device; and operation 1003: the source central unit transmits correspondence indication information to the integrated access and backhaul node.

The correspondence indication information is used to indicate: a correspondence between identification information of the configuration in the second reconfiguration message and identification information (such as a PCI) of a target cell in the first reconfiguration message; a correspondence between identification information of the configuration in the second reconfiguration message (conditional RRC reconfiguration) and identification information of configuration in the first reconfiguration message; a correspondence between a target cell and identification information (CondReconfigId) of the configuration or the configuration (condRRCReconfig) included in the second reconfiguration message (conditional RRC reconfiguration).

In FIGS. 8, 9 and 10, the integrated access and backhaul node is, for example, IAB-node 3 in FIG. 2, the radio device is, for example, UE1, or UE2, or IAB-node 4 in FIG. 2, and the target central unit refers to a central unit that IAB-node 3 is to be connected or has already been connected based on the first reconfiguration message, such as the target IAB-donor in FIG. 2.

According to the embodiment of the third aspect of this disclosure, the radio device UE or IAB-node (such as UE1, or UE2, or UE3, or IAB-node 4) under the migrated or to-be-migrated IAB-node (such as IAB-node 3) may apply at the RRC layer the configuration in the second reconfiguration information, such as security key-related configuration, so as to correctly communicate with the new IAB-donor, and the complexity of the scheme is relatively low and has little impact on current standards. In addition, for scenarios of intra-CU migration, the method of the embodiment of the third aspect of this disclosure is also applicable, so that the radio device (such as UE1, or UE2, or IAB-node 4) under the migrated or to-be-migrated IAB-node (such as IAB-node 3) may apply the new configuration in a timely manner.

Embodiment of a Fourth Aspect

The embodiment of this disclosure provides an apparatus for receiving and transmitting signals. The apparatus may be, for example, an integrated access and backhaul node, or one or some components or assemblies configured in the integrated access and backhaul node. The integrated access and backhaul node is, for example, IAB-node 3 in FIG. 2. This apparatus corresponds to the embodiment of the first aspect.

Figure 11:
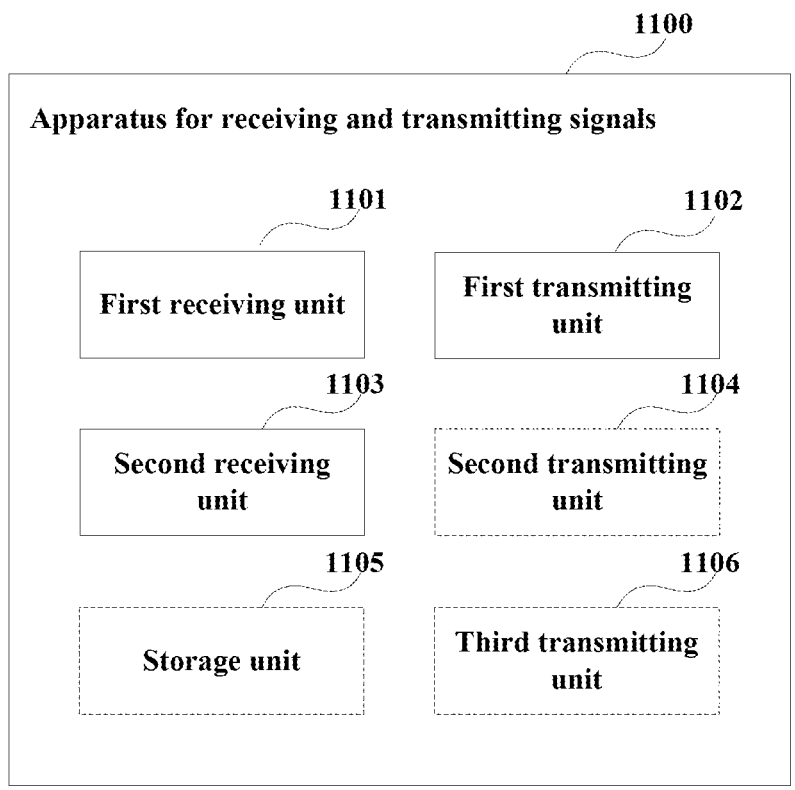
FIG. 11 is a schematic diagram of the apparatus for receiving and transmitting signals in an embodiment of a fourth aspect of this disclosure.

FIG. 11 is a schematic diagram of the apparatus for receiving and transmitting signals of the embodiment of this disclosure. As shown in FIG. 11, the apparatus 1100 for receiving and transmitting signals includes:

a first receiving unit 1101 configured to receive a first reconfiguration message; and a first transmitting unit 1102 configured to transmit indication information to a radio device, the indication information being used to indicate that the radio device applies configuration in a second reconfiguration message.

The radio device includes a terminal equipment, such as UE1-UE3 in FIG. 2, or a next-level integrated access and backhaul node of the integrated access and backhaul node, IAB-node 4.

In at least one embodiment, an occasion of transmitting the indication information by the first transmitting unit 1102 to the radio device is one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARQ) feedback message.

In some embodiments, the indication information enables or disables the radio device: to apply configuration in the second reconfiguration message, or perform migration, or change a CU, etc. A target candidate cell with the same ID as a UE served by IAB-node 3 or a cell of a downlink IAB-node (i.e. a cell serving for the current radio device, UE1, or UE2, or UE3, or IAB-node 4) is configured once or appears once. For example, the ID may be a PCI or a cell ID or a cell global ID (CGI) or an E-UTRAN cell global identifier (ECGI), etc. Hence, the indication information enables the radio device to apply configuration of a target candidate cell having the same identifier as a current serving cell in the second reconfiguration message.

In addition, this disclosure may not be limited thereto. In at least some embodiments, in the second reconfiguration message (for example, in the ServingCellConfigCommon included in the reconfigurationWithSync), a target candidate cell that has the same identity as the cell serving the UE or downlink IAB-node of IAB-node 3 (that is, the serving cell currently serving the radio device UE1, UE2, or IAB-node 4) is configured more than twice (that is, appears more than twice) or is not configured (that is, does not appear).

In some other embodiments, the indication information indicates the information of a central unit, wherein the central unit refers to a central unit that the integrated access and backhaul node is to be connected or has already been connected based on the first reconfiguration message, such as the target IAB-donor in FIG. 2.

The second reconfiguration message includes the information on the central unit and a configuration to which the information on the central unit corresponds.

In some embodiments, the indication information may indicate the configuration applied by the radio device.

As shown in FIG. 11, the apparatus 1100 for receiving and transmitting signals may further include:

a second receiving unit 1103 configured to receive correspondence indication information.

The correspondence indication information is used to indicate: a correspondence between identification information of the configuration in the second reconfiguration message and identification information of a target cell in the first reconfiguration message; or a correspondence between identification information of the configuration in the second reconfiguration message and identification information of configuration in the first reconfiguration message; or a correspondence between a target cell and identification information of the configuration or the configuration included in the second reconfiguration message.

As shown in FIG. 11, the apparatus 1100 for receiving and transmitting signals may further include:

a second transmitting unit 1104 configured to forward the second reconfiguration message.

As shown in FIG. 11, the apparatus 1100 for receiving and transmitting signals may further include:

a storage unit 1105 configured to store the second reconfiguration message; and a third transmitting unit 1106 configured to transmitting the second reconfiguration message to the integrated access and backhaul node.

An occasion of transmitting the second reconfiguration message by the third transmitting unit 1106 to the radio device may be one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARM) feedback message.

In this disclosure, the apparatus 1100 for receiving and transmitting signals may use the second transmitting unit 1104 to forward the second reconfiguration message, or use the storage unit 1105 and the third transmitting unit 1106 to store and transmit the second reconfiguration message.

In the case where the storage unit 1105 and the third transmitting unit 1106 are used to store and transmit the second reconfiguration message, in some embodiments, the apparatus 1100 for receiving and transmitting signals simultaneously transmits the second reconfiguration message and indication information to the radio device; for example, the third transmitting unit 1106 and the first transmitting unit 1102 simultaneously transmit the second reconfiguration message and indication information, or, the second reconfiguration message and indication information are combined into one message and transmitted by the third transmitting unit 1106 or the first transmitting unit 1102. In addition, the apparatus 1100 for receiving and transmitting signals may not simultaneously transmit the second reconfiguration message and indication information.

Furthermore, for the sake of simplicity, connection relationships between the components or modules or signal profiles thereof are only illustrated in the apparatus 1100 for receiving and transmitting signals. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

Embodiment of a Fifth Aspect

The embodiment of this disclosure provides a signal receiving apparatus. The apparatus may be, for example, a radio device, or one or some components or assemblies configured in the radio device. The radio device is, for example, UE1, or UE2, or IAB-node 4 in FIG. 2. The signal receiving apparatus corresponds to the embodiment of the second aspect.

Figure 12:
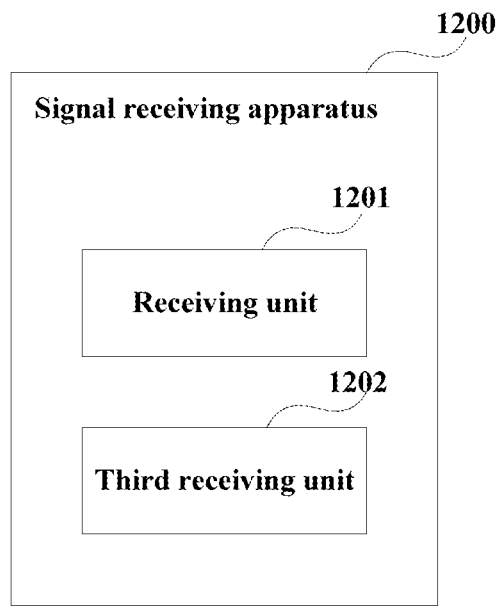
FIG. 12 is a schematic diagram of the signal receiving apparatus in an embodiment of a fifth aspect of this disclosure.

FIG. 12 is a schematic diagram of the signal receiving apparatus in the embodiment of this disclosure. As shown in FIG. 12, the signal receiving apparatus 1200 includes:

a receiving unit 1201 configured to receive a second reconfiguration message; and a third receiving unit 1202 configured to receive indication information, the indication information being used to indicate that the radio device applies configuration in the second reconfiguration message in a radio resource control layer.

An occasion of receiving by the third receiving unit 1202 the indication information transmitted by the integrated access and backhaul node (such as IAB-node 3 in FIG. 2) is one of the following occasions:

an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);

an occasion of initiating execution of conditional handover or conditional reconfiguration by IAB-node 3 in a case where IAB-node 3 migrates or reconfigures or changes a CU in a manner of conditional handover/reconfiguration;

an occasion of receiving the first reconfiguration message by IAB-node 3, such as receiving the RRC reconfiguration message;

an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;

an occasion when IAB-node 3 is downlink synchronized with a new parent node or a target parent node (target parent IAB-node), such as when an SSB of a cell under the new parent node or target parent node is detected;

an occasion of initiating a random access procedure to a new parent node or a target parent node (target parent IAB-node) by IAB-node 3, wherein the new parent IAB-node or target parent IAB-node is, for example, IAB-node 2 in FIG. 2, and the initiating a random access procedure may be, for example, initiating a random access procedure or selecting a random access resource or transmission of a random access preamble or transmission of a message A (MSG A), etc.;

an occasion of transmitting a reconfiguration complete (such as RRC reconfiguration complete) message based on the first reconfiguration message by IAB-node 3 to a new parent node or a target parent node (parent IAB-node);

an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARM) feedback message. The third receiving unit 1202 receives the indication information via a backhaul adaptive protocol data unit, or a radio link layer control protocol data unit, or a media access control element, or a media access control subheader, or physical layer signaling.

In some embodiments, the indication information enables or disables the radio device: to apply configuration in the second reconfiguration message. In the second reconfiguration message, a target candidate cell with the same ID as a UE served by IAB-node 3 or a cell of a downlink IAB-node (i.e. a cell serving for the current radio device, UE1, or UE2, or UE3, or IAB-node 4) is configured once or appears once. For example, the ID may be a PCI or a cell ID or a cell global ID (CGI) or an E-UTRAN cell global identifier (ECGI), etc. The radio device applies configuration of a target candidate cell having the same identifier as a current serving cell in the second reconfiguration message in the radio resource control layer.

In addition, this disclosure may not be limited thereto, and in at least some embodiments, in the second reconfiguration message (such as in ServingCellConfigCommon included in reconfigurationWithSync), a target candidate cell with the same ID as the cell of IAB-node 3 serving for the UE or the cell of the downlink IAB-node (i.e. the cell serving for the current radio device, UE1, or UE2, or IAB-node 4) is configured more than twice (i.e. appears more than twice) or is not configured (i.e. does not appear).

In some other embodiments, the indication information indicates information of a central unit (CU). The central unit is a central unit to which the integrated access and backhaul node is to be connected or has been connected based on the first reconfiguration message, such as the target IAB donor in FIG. 2. The second reconfiguration message includes the information of the central unit and configuration corresponding to the information of the central unit, and the radio device determines the configuration in the second reconfiguration message corresponding to the information of the central unit according to the information of the central unit in the indication information, and applies the configuration in the second reconfiguration message in the radio resource control layer In some other embodiments, the indication information indicates the configuration applied by the radio device.

For example, there exists a correspondence between identification information of the configuration in the second reconfiguration message and identification information of a target cell in the first reconfiguration message, or, there exists a correspondence between identification information of the configuration in the second reconfiguration message and identification information of configuration in the first reconfiguration message, or, there exists a correspondence between a target cell and identification information of the configuration or the configuration included in the second reconfiguration message.

In this disclosure, an occasion of receiving by the receiving unit 1201 the second reconfiguration message transmitted by the integrated access and backhaul node is one of the following occasions:

- an occasion of determining by IAB-node 3 that a measurement event related to conditional reconfiguration is satisfied in a case where IAB-node 3 migrates or reconfigures or changes a CU in a manner of conditional handover/reconfiguration; for example, the measurement event may be event A3 (where quality of a neighboring cell is better than quality of a serving cell by an offset) or event A5 (where quality of a serving cell is lower than a threshold, and quality of a neighboring cell is higher than another threshold);
- an occasion of initiating execution of conditional handover or conditional reconfiguration by IAB-node 3 in a case where IAB-node 3 migrates or reconfigures or changes a CU in a manner of conditional handover/reconfiguration;
- an occasion of receiving the first reconfiguration message by IAB-node 3, such as receiving the RRC reconfiguration message;
- an occasion when IAB-node 3 is detached from a source central unit or parent node (source IAB-donor/source parent IAB-node), the source central unit is, for example, the source IAB-donor in FIG. 2, and the source parent node is, for example, IAB-node 1 in FIG. 2;
- an occasion when IAB-node 3 is downlink synchronized with a new parent node or a target parent node (target parent IAB-node), such as when an SSB of a cell under the new parent node or target parent node is detected;
- an occasion of initiating a random access procedure to a new parent node or a target parent node (target parent IAB-node) by IAB-node 3, wherein the new parent node or target parent node is, for example, IAB-node 2 in FIG. 2, and the initiating a random access procedure may be, for example, initiating a random access procedure or selecting a random access resource or transmission of a random access preamble or transmission of a message A (MSG A), etc.;
- an occasion of transmitting a reconfiguration complete (such as RRC reconfiguration complete) message based on the first reconfiguration message by IAB-node 3 to a new parent node or a target parent node (parent IAB-node);
- an occasion when IAB-node 3 succeeds in a random access procedure, for example, IAB-node 3 succeeds in a procedure of random access to a new parent node or a target parent node (parent IAB-node), such as receiving a random access response or success of contention resolution or receiving a message B (MSG B), etc.; and
- an occasion of receiving an acknowledgement message or a feedback message for the reconfiguration complete (such as RRC reconfiguration complete) message by IAB-node 3 from its new parent node (parent IAB-node), wherein the acknowledgement message is, for example, a radio link control (RLC) layer acknowledgement message, and the feedback message is, for example, a hybrid automatic repeat request (HARQ) feedback message.

In some embodiments, the signal receiving apparatus 1200 simultaneously receives the second reconfiguration message and the indication information from the integrated access and backhaul node. For example, an occasion of receiving the second reconfiguration message by the receiving unit 1201 is identical to an occasion of receiving the indication information by the third receiving unit 1202, or the second reconfiguration message and indication information are combined into one message and transmitted, and the message is received by the receiving unit 1201 or the third receiving unit 1202. In addition, the signal receiving apparatus 1200 may not receive the second reconfiguration message and the indication information simultaneously.

Furthermore, for the sake of simplicity, connection relationships between the components or modules or signal profiles thereof are only illustrated in the signal receiving apparatus 1200. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

Embodiment of a Sixth Aspect

The embodiment of this disclosure provides an apparatus for transmitting a signal. The apparatus may be, for example, a source central unit, or one or some components or assemblies configured in the source central unit. The source central unit is, for example, the source IAB donor in FIG. 2. The apparatus for transmitting a signal corresponds to the embodiment of the third aspect.

Figure 13:
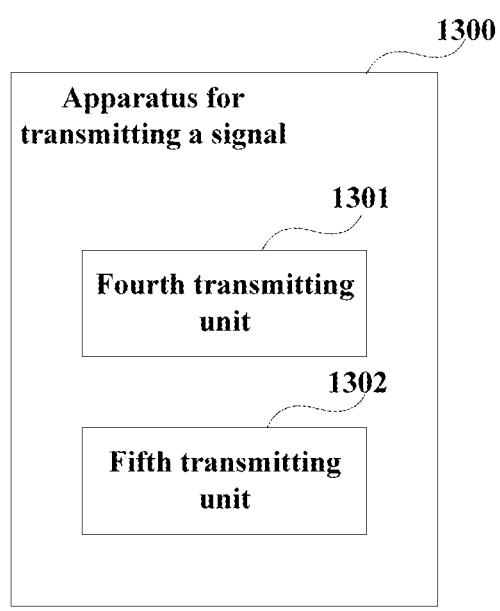
FIG. 13 is a schematic diagram of the apparatus for transmitting a signal in an embodiment of a sixth aspect of this disclosure.

FIG. 13 is a schematic diagram of the apparatus for transmitting a signal of the embodiment of this disclosure. As shown in FIG. 13, the apparatus 1300 for transmitting a signal includes:

a fourth transmitting unit 1301 configured to transmit a first reconfiguration message to an integrated access and backhaul node; and a fifth transmitting unit 1302 configured to transmit a second reconfiguration message to a radio device;

in the second reconfiguration message, a target candidate cell having the same identifier as a current serving cell of the integrated access and backhaul node is configured once.

Figure 14:
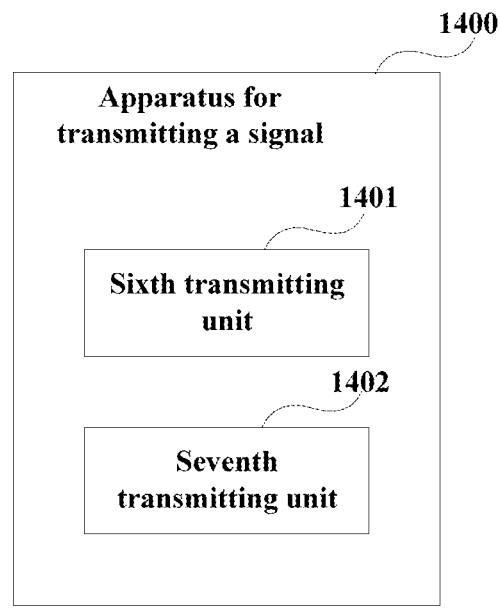
FIG. 14 is another schematic diagram of the apparatus for transmitting a signal in the embodiment of the sixth aspect of this disclosure.

FIG. 14 is another schematic diagram of the apparatus for transmitting a signal of the embodiment of this disclosure. As shown in FIG. 14, the apparatus 1400 for transmitting a signal includes:

a sixth transmitting unit 1401 configured to transmit a first reconfiguration message to an integrated access and backhaul node; and a seventh transmitting unit 1402 configured to transmit a second reconfiguration message to a radio device, the second reconfiguration message including the information of the target central unit and configuration corresponding to the information of the target central unit, and the target central unit referring to a central unit that the integrated access and backhaul node is to be connected or has already been connected based on the first reconfiguration message.

Figure 15:
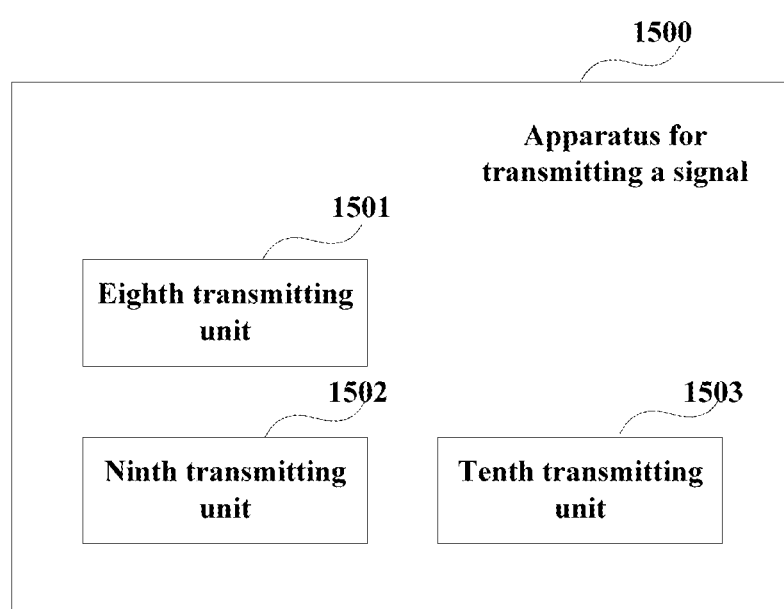
FIG. 15 is a further schematic diagram of the apparatus for transmitting a signal in the embodiment of the sixth aspect of this disclosure.

FIG. 15 is a further schematic diagram of the apparatus for transmitting a signal of the embodiment of this disclosure. As shown in FIG. 15, the apparatus 1500 for transmitting a signal includes:

an eighth transmitting unit 1501 configured to transmit a first reconfiguration message to an integrated access and backhaul node;

a ninth transmitting unit 1201 configured to transmit a second reconfiguration message to a radio device; and a tenth transmitting unit 1503 configured to transmit correspondence indication information to the integrated access and backhaul node.

The correspondence indication information is used to indicate:

a correspondence between identification information of the configuration in the second reconfiguration message and identification information of a target cell in the first reconfiguration message; or, a correspondence between identification information of the configuration in the second reconfiguration message and identification information of configuration in the first reconfiguration message; or, a correspondence between a target cell and identification information of the configuration or the configuration included in the second reconfiguration message.

In FIGS. 13, 14 and 15, the integrated access and backhaul node is, for example, IAB-node 3 in FIG. 2, the radio device is, for example, UE1, or UE2, or IAB-node 4 in FIG. 2, and the target central unit refers to a central unit that IAB-node 3 is to be connected or has already been connected based on the first reconfiguration message, such as the target IAB-donor in FIG. 2.

Furthermore, for the sake of simplicity, connection relationships between the components or modules or signal profiles thereof are only illustrated in the apparatus 1300 or 1400 or 1500 for transmitting a signal. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

Embodiment of a Seventh Aspect

The embodiment of this disclosure provides a communication system, and reference may be made to FIG. 1, with contents identical to those in the embodiments of the first to the sixth aspects being not going to be described herein any further.

In some embodiments, the communication system may include:

a source central unit, including the apparatus 1300 or 1400 or 1500 for transmitting a signal described in the embodiment of the sixth aspect;

a radio device including the signal receiving apparatus 1200 described in the embodiment of the fifth aspect; and an integrated access and backhaul node including the apparatus 1100 for receiving and transmitting signals described in the embodiment of the fourth aspect.

The embodiment of this disclosure further provides an integrated access and backhaul node; however, this disclosure is not limited thereto, and it may also be another device.

Figure 16:
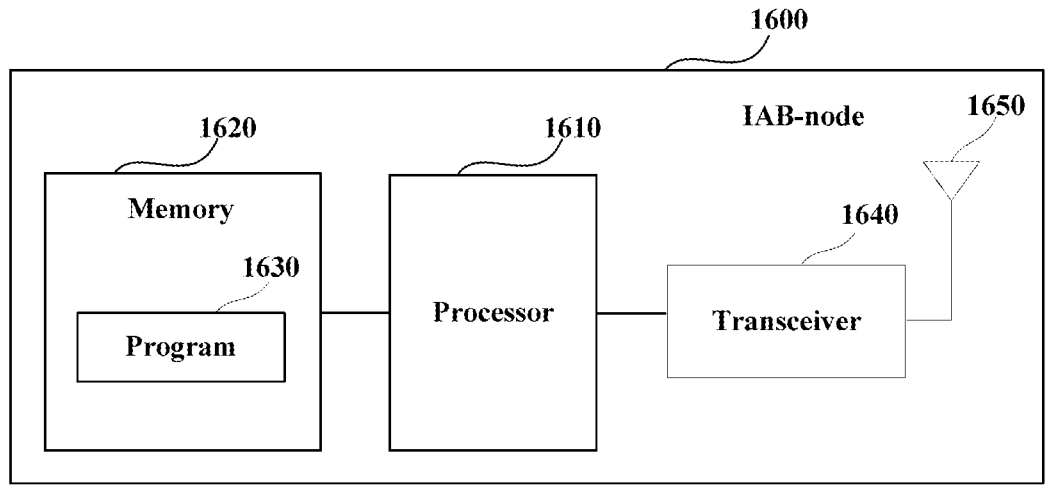
FIG. 16 is a schematic diagram of a structure of an integrated access and backhaul node (IAB-node) in an embodiment of a seventh aspect of this disclosure.

FIG. 16 is a schematic diagram of a structure of the integrated access and backhaul node (IAB-node) of the embodiment of this disclosure. As shown in FIG. 16, the IAB-node 1600 may include a processor 1610 (such as a central processing unit (CPU)) and a memory 1620, the memory 1620 being coupled to the processor 1610. The memory 1620 may store various data, and furthermore, it may store a program 1630 for data processing, and execute the program 1630 under control of the processor 1610. The IAB-node 1600 may be a source central unit (such as the source IAB-donor in FIG. 2), or a next-level IAB-node in the radio device, or IAB-node 3 in FIG. 2.

For example, the processor 1610 may be configured to execute a program to carry out the method as described in the embodiment of the first or second or third aspect.

Furthermore, as shown in FIG. 16, the network device 1600 may further include a transceiver 1640, and an antenna 1650, etc. Functions of the above components are similar to those in the related art, and shall not be described herein any further. It should be noted that the network device 1600 does not necessarily include all the parts shown in FIG. 16, and furthermore, the network device 1600 may include parts not shown in FIG. 16, and the related art may be referred to.

The embodiment of this disclosure further provides a terminal equipment; however, this disclosure is not limited thereto, and it may also be another equipment.

Figure 17:
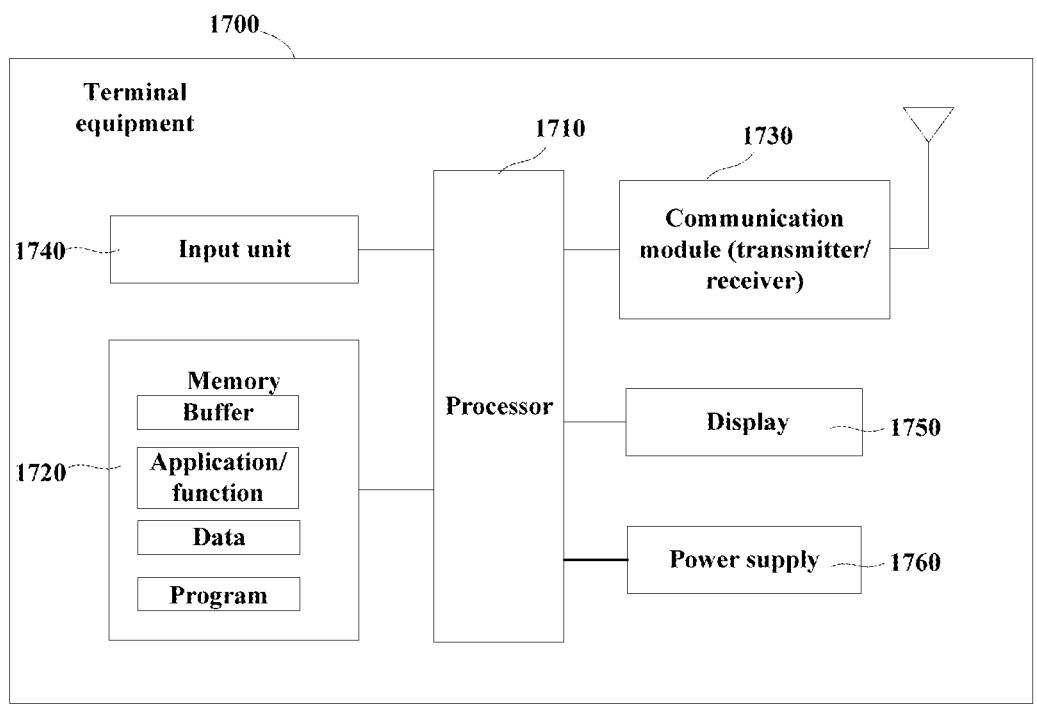
FIG. 17 is a schematic diagram of a structure of a terminal equipment in the embodiment of the seventh aspect of this disclosure.

FIG. 17 is a schematic diagram of a structure of a terminal equipment of the embodiment of this disclosure. As shown in FIG. 17, the terminal equipment 1700 may include a processor 1710 and a memory 1720, the memory 1720 storing data and a program and being coupled to the processor 1710. It should be noted that this figure is illustrative only, and other types of structures may also be used, so as to supplement or replace this structure and achieve a telecommunications function or other functions. The terminal equipment 1700 may be at least one of UE1, UE2 and UE3 in a radio device.

For example, the processor 1710 may be configured to execute a program to carry out the method as described in the embodiment of the second aspect.

As shown in FIG. 17, the terminal equipment 1700 may further include a communication module 1730, an input unit 1740, a display 1750, and a power supply 1760; functions of the above components are similar to those in the related art, which shall not be described herein any further. It should be noted that the terminal equipment 1700 does not necessarily include all the parts shown in FIG. 17, and the above components are not necessary. Furthermore, the terminal equipment 1700 may include parts not shown in FIG. 17, and the related art may be referred to.

An embodiment of this disclosure provides a computer readable program, which, when executed in a terminal equipment, will cause the terminal equipment to carry out the signal receiving method as described in the embodiment of the second aspect.

An embodiment of this disclosure provides a storage medium, including a computer readable program, which will cause a terminal equipment to carry out the signal receiving method as described in the embodiment of the second aspect.

An embodiment of this disclosure provides a computer readable program, which, when executed in an IAB-node, will cause the IAB-node to carry out the method as described in the embodiment of the first or third aspect.

An embodiment of this disclosure provides a storage medium, including a computer readable program, which will cause an IAB-node to carry out the method as described in the embodiment of the first or third aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

A method at an IAB-node side:

1. A method for receiving and transmitting signals, comprising:
   receiving a first reconfiguration message by an integrated access and backhaul node; and
   transmitting indication information by the integrated access and backhaul node to a radio device, the indication information being used to indicate that the radio device applies configuration in a second reconfiguration message.

2. The method according to supplement 1, wherein,
   an occasion of transmitting the indication information by the integrated access and backhaul node to the radio device is one of the following occasions:
   an occasion of determining by the integrated access and backhaul node that a measurement event related to conditional reconfiguration is satisfied;
   an occasion of initiating execution of conditional handover or conditional reconfiguration by the integrated access and backhaul node;
   an occasion of receiving the first reconfiguration message by the integrated access and backhaul node;
   an occasion when the integrated access and backhaul node is detached from a source central unit or a parent node;
   an occasion when the integrated access and backhaul node is downlink synchronized with a new parent node or a target parent node;
   an occasion of initiating a random access procedure to a new parent node or a target parent node by the integrated access and backhaul node;
   an occasion of transmitting a reconfiguration complete message based on the first reconfiguration message by the integrated access and backhaul node to a new parent node or a target parent node;

an occasion when the integrated access and backhaul node succeeds in a random access procedure; and an occasion of receiving an acknowledgement message or a feedback message for the reconfiguration complete message by the integrated access and backhaul node from its parent node.

3. The method according to either one of supplements 1 and 2, wherein, the indication information enables or disables the radio device:

to apply configuration in the second reconfiguration message.

4. The method according to supplement 3, wherein, in the second reconfiguration message, a target candidate cell having the same identifier as a current serving cell of the integrated access and backhaul node is configured once.

5. The method according to supplement 3, wherein, the indication information enables the radio device to apply configuration of a target candidate cell having the same identifier as a current serving cell in the second reconfiguration message.

6. The method according to either one of supplements 1 and 2, wherein, the indication information indicates information of the central unit, the central unit referring to a central unit to which the integrated access and backhaul node will be connected or has been connected based on the first reconfiguration message.

7. The method according to supplement 6, wherein, the second reconfiguration message includes the information of the central unit and the configuration corresponding to the information of the central unit.

8. The method according to either one of supplements 1 and 2, wherein, the indication information indicates the configuration applied by the radio device.

9. The method according to supplement 8, wherein the method further comprises:

receiving correspondence indication information, the correspondence indication information being used to indicate:

a correspondence between identification information of the configuration in the second reconfiguration message and identification information of a target cell in the first reconfiguration message;

a correspondence between identification information of the configuration in the second reconfiguration message and identification information of configuration in the first reconfiguration message; and a correspondence between a target cell and identification information of the configuration or the configuration included in the second reconfiguration message.

10. The method according to any one of supplements 1-9, wherein, the integrated access and backhaul node transmits the indication information to the radio device via a backhaul adaptive protocol data unit, or a radio link layer control protocol data unit, or a media access control control element, or a media access control subheader, or physical layer signaling.

11. The method according to any one of supplements 1-9, wherein the method further comprises:

further forwarding the second reconfiguration message by the integrated access and backhaul node to the radio device.

12. The method according to any one of supplements 1-9, wherein the method further comprises:

storing the second reconfiguration message by the integrated access and backhaul node; and transmitting the second reconfiguration message by the integrated access and backhaul node to the radio device.

13. The method according to supplement 12, wherein, an occasion of transmitting the second reconfiguration message by the integrated access and backhaul node to the radio device is one of the following occasions:

an occasion of determining by the integrated access and backhaul node that a measurement event related to conditional reconfiguration is satisfied;

an occasion of initiating execution of conditional handover or conditional reconfiguration by the integrated access and backhaul node;

an occasion of receiving the first reconfiguration message by the integrated access and backhaul node;

an occasion when the integrated access and backhaul node is detached from a source central unit or a parent node;

an occasion when the integrated access and backhaul node is downlink synchronized with a new parent node or a target parent node;

an occasion of initiating a random access procedure to a new parent node or a target parent node by the integrated access and backhaul node;

an occasion of transmitting a reconfiguration complete message based on the first reconfiguration message by the integrated access and backhaul node to a new parent node or a target parent node;

an occasion when the integrated access and backhaul node succeeds in a random access procedure; and an occasion of receiving an acknowledgement message or a feedback message for the reconfiguration complete message by the integrated access and backhaul node from its parent node.

14. The method according to supplement 13, wherein, the integrated access and backhaul node simultaneously transmits the second reconfiguration message and the indication information to the radio device.

15. The method according to any one of supplements 1-14, wherein, the radio device is:

a terminal equipment, or, a next level integrated access and backhaul node of the integrated access and backhaul node.

A method at a UE and descendant IAB-node side:

1. A signal receiving method, comprising:

receiving a second reconfiguration message by a radio device; and receiving indication information by the radio device, the indication information being used to indicate that the radio device applies configuration in the second reconfiguration message in a radio resource control layer.

2. The method according to supplement 1, wherein, an occasion of receiving by the radio device the indication information transmitted by the integrated access and backhaul node is one of the following occasions:

an occasion of determining by the integrated access and backhaul node that a measurement event related to conditional reconfiguration is satisfied;

an occasion of initiating execution of conditional handover or conditional reconfiguration by the integrated access and backhaul node;

an occasion of receiving the first reconfiguration message by the integrated access and backhaul node;

an occasion when the integrated access and backhaul node is detached from a source central unit or a parent node;

an occasion when the integrated access and backhaul node is downlink synchronized with a new parent node or a target parent node;

an occasion of initiating a random access procedure to a new parent node or a target parent node by the integrated access and backhaul node;

an occasion of transmitting a reconfiguration complete message based on the first reconfiguration message by the integrated access and backhaul node to a new parent node or a target parent node;

an occasion when the integrated access and backhaul node succeeds in a random access procedure; and an occasion of receiving an acknowledgement message or a feedback message for the reconfiguration complete message by the integrated access and backhaul node from its parent node.

3. The method according to either one of supplements 1 and 2, wherein, the indication information enables or disables the radio device:

to apply configuration in the second reconfiguration message in the radio resource control layer.

4. The method according to supplement 3, wherein, in the second reconfiguration message, a target candidate cell having the same identifier as a current serving cell of the integrated access and backhaul node is configured once.

5. The method according to supplement 4, wherein, the radio device applies configuration of a target candidate cell having the same identifier as a current serving cell in the second reconfiguration message in the radio resource control layer.

6. The method according to either one of supplements 1 and 2, wherein, the indication information indicates information of a central unit, the central unit referring to a central unit to which the integrated access and backhaul node will be connected or has been connected based on the first reconfiguration message.

7. The method according to supplement 6, wherein, the second reconfiguration message includes the information of the central unit and the configuration corresponding to the information of the central unit, and the radio device determines the configuration in the second reconfiguration message corresponding to the information of the central unit according to the information of the central unit in the indication information, and applies the configuration in the radio resource control layer.

8. The method according to either one of supplements 1 and 2, wherein, the indication information indicates the configuration applied by the radio device.

9. The method according to supplement 7, wherein, there exists a correspondence between identification information of the configuration in the second reconfiguration message and identification information of a target cell in the first reconfiguration message, or there exists a correspondence between identification information of the configuration in the second reconfiguration message and identification information of configuration in the first reconfiguration message, or there exists a correspondence between a target cell and identification information of the configuration or the configuration included in the second reconfiguration message.

10. The method according to any one of supplements 1-9, wherein, the radio device receives the indication information via a backhaul adaptive protocol data unit, or a radio link layer control protocol data unit, or a media access control control element, or a media access control subheader, or physical layer signaling.

11. The method according to supplement 1, wherein, an occasion of receiving by the radio device the second reconfiguration message transmitted by the integrated access and backhaul node is one of the following occasions:

an occasion of determining by the integrated access and backhaul node that a measurement event related to conditional reconfiguration is satisfied;

an occasion of initiating execution of conditional handover or conditional reconfiguration by the integrated access and backhaul node;

an occasion of receiving the first reconfiguration message by the integrated access and backhaul node;

an occasion when the integrated access and backhaul node is detached from a source central unit or a parent node;

an occasion when the integrated access and backhaul node is downlink synchronized with a new parent node or a target parent node;

an occasion of initiating a random access procedure to a new parent node or a target parent node by the integrated access and backhaul node;

an occasion of transmitting a reconfiguration complete message based on the first reconfiguration message by the integrated access and backhaul node to a new parent node or a target parent node;

an occasion when the integrated access and backhaul node succeeds in a random access procedure; and an occasion of receiving an acknowledgement message or a feedback message for the reconfiguration complete message by the integrated access and backhaul node from its parent node.

12. The method according to supplement 11, wherein, the radio device simultaneously receives the second reconfiguration message and the indication information from the integrated access and backhaul node.

13. The method according to any one of supplements 1-12, wherein, the radio device is:

a terminal equipment, or, a next level integrated access and backhaul node of the integrated access and backhaul node.

A method at a source donor side:

1. A method for transmitting a signal, comprising:

transmitting a first reconfiguration message by a central unit to an integrated access and backhaul node; and transmitting a second reconfiguration message by the central unit to a radio device;

in the second reconfiguration message, a target candidate cell having the same identifier as a current serving cell of the integrated access and backhaul node is configured once.

2. A method for transmitting a signal, comprising:

transmitting a first reconfiguration message by a source central unit to an integrated access and backhaul node; and transmitting a second reconfiguration message by the source central unit to a radio device;
wherein the second reconfiguration message comprises information of a target central unit and the configuration corresponding to the information of the target central unit,
the target central unit referring to a central unit to which the integrated access and backhaul node will be connected or has been connected based on the first reconfiguration message.

3. A method for transmitting a signal, comprising:
transmitting a first reconfiguration message by a source central unit to an integrated access and backhaul node;
transmitting a second reconfiguration message by the source central unit to a radio device; and transmitting correspondence indication information to the integrated access and backhaul node,
the correspondence indication information being used to indicate:
a correspondence between identification information of the configuration in the second reconfiguration message and identification information of a target cell in the first reconfiguration message;
a correspondence between identification information of the configuration in the second reconfiguration message and identification information of configuration in the first reconfiguration message; and
a correspondence between a target cell and identification information of the configuration or the configuration included in the second reconfiguration message.

4. The method according to any one of supplements 1-3, wherein,
the radio device is:
a terminal equipment,
or, a next level integrated access and backhaul node of the integrated access and backhaul node.

The invention claimed is:

1. An apparatus for receiving and transmitting signals, applicable to an integrated access and backhaul (IAB) node, comprising:
   a first receiver configured to receive a first reconfiguration message; and
   a first transmitter configured to transmit indication information to a radio device, the indication information being used to indicate that the radio device applies configuration in a second reconfiguration message;
   wherein the first receiver receives the first reconfiguration message in a case where,
   after a target central unit of the integrated access and backhaul node receives a handover request transmitted by a source central unit of the integrated access and backhaul node, the target central unit transmits a request to a target parent node of the integrated access and backhaul node, and the target parent node transmits a response to the request;
   after the target central unit receives the response to the request transmitted by the target parent node, the target central unit transmits a handover request acknowledgement message to the source central unit of the integrated access and backhaul node;
   after the source central unit receives the handover request acknowledgement message, the source central unit transmits a terminal equipment context modification request to a source parent node of the integrated access and backhaul node, the source parent node transmits the first reconfiguration message to the integrated access and backhaul node.

2. The apparatus according to claim 1, wherein,
an occasion for the first transmitter to transmit the indication information to the radio device is one of the following occasions:
an occasion of determining by the integrated access and backhaul node that a measurement event related to conditional reconfiguration is satisfied;
an occasion of initiating execution of conditional handover or conditional reconfiguration by the integrated access and backhaul node;
an occasion of receiving the first reconfiguration message by the integrated access and backhaul node;
an occasion when the integrated access and backhaul node is detached from a source central unit or a parent node;
an occasion when the integrated access and backhaul node is downlink synchronized with a new parent node or a target parent node;
an occasion of initiating a random access procedure to a new parent node or a target parent node by the integrated access and backhaul node;
an occasion of transmitting a reconfiguration complete message based on the first reconfiguration message by the integrated access and backhaul node to a new parent node or a target parent node;
an occasion when the integrated access and backhaul node succeeds in a random access procedure; and
an occasion of receiving an acknowledgement message or a feedback message for the reconfiguration complete message by the integrated access and backhaul node from its parent node.

3. The apparatus according to claim 1, wherein,
the indication information enables or disables the radio device:
to apply configuration in the second reconfiguration message.

4. The apparatus according to claim 3, wherein,
in the second reconfiguration message, a target candidate cell having the same identifier as a current serving cell of the integrated access and backhaul node is configured once.

5. The apparatus according to claim 3, wherein,
the indication information enables the radio device to apply configuration of a target candidate cell having the same identifier as a current serving cell in the second reconfiguration message.

6. The apparatus according to claim 1, wherein,
the indication information indicates information of the central unit,
the central unit referring to a central unit to which the integrated access and backhaul node will be connected or has been connected based on the first reconfiguration message.

7. The apparatus according to claim 6, wherein,
the second reconfiguration message includes the information of the central unit and the configuration corresponding to the information of the central unit.

8. The apparatus according to claim 1, wherein,
the indication information indicates the configuration applied by the radio device.

9. The apparatus according to claim 8, wherein the apparatus further comprises:
a second receiver configured to receive correspondence indication information,
the correspondence indication information being used to indicate:
a correspondence between identification information of the configuration in the second reconfiguration message and identification information of a target cell in the first reconfiguration message; or a correspondence between identification information of the configuration in the second reconfiguration message and identification information of configuration in the first reconfiguration message; or a correspondence between a target cell and identification information of the configuration or the configuration included in the second reconfiguration message.

10. The apparatus according to claim 1, wherein,
the first receiver transmits the indication information to the radio device via a backhaul adaptive protocol data unit, or a radio link layer control protocol data unit, or a media access control control element, or a media access control subheader, or physical layer signaling.

11. A signal receiving apparatus, applicable to a radio device, comprising:
a receiver configured to receive a message combined by a second reconfiguration message and an indication information,
the indication information being used to indicate that the radio device applies configuration in the second reconfiguration message in a radio resource control layer,
wherein, the receiver is configured to receive the second reconfiguration message in a case where,
during a process of a parent node of an integrated access and backhaul node is changed from being connected to a source parent node of the integrated access and backhaul node to being connected to a target parent node of a target central unit,
a source central unit of the integrated access and backhaul node transmits the second reconfiguration message to the integrated access and backhaul node, the integrated access and backhaul node transmits the second reconfiguration message to the wireless device.

12. The apparatus according to claim 11, wherein,
an occasion of receiving by the receiver the indication information transmitted by the integrated access and backhaul node is one of the following occasions:
an occasion of determining by the integrated access and backhaul node that a measurement event related to conditional reconfiguration is satisfied;
an occasion of initiating execution of conditional handover or conditional reconfiguration by the integrated access and backhaul node;
an occasion of receiving the first reconfiguration message by the integrated access and backhaul node;
an occasion when the integrated access and backhaul node is detached from a source central unit or a parent node;
an occasion when the integrated access and backhaul node is downlink synchronized with a new parent node or a target parent node;
an occasion of initiating a random access procedure to a new parent node or a target parent node by the integrated access and backhaul node;
an occasion of transmitting a reconfiguration complete message based on the first reconfiguration message by the integrated access and backhaul node to a new parent node or a target parent node;
an occasion when the integrated access and backhaul node succeeds in a random access procedure; and an occasion of receiving an acknowledgement message or a feedback message for the reconfiguration complete message by the integrated access and backhaul node from its parent node.

13. The apparatus according to claim 11, wherein,
the indication information enables or disables the radio device:
to apply configuration in the second reconfiguration message in the radio resource control layer.

14. The apparatus according to claim 13, wherein,
the radio device applies configuration of a target candidate cell having the same identifier as a current serving cell in the second reconfiguration message in the radio resource control layer.

15. The apparatus according to claim 11, wherein,
the indication information indicates information of a central unit,
the central unit referring to a central unit to which the integrated access and backhaul node will be connected or has been connected based on the first reconfiguration message.

16. The apparatus according to claim 15, wherein,
the second reconfiguration message includes the information of the central unit and the configuration corresponding to the information of the central unit,
and the radio device determines the configuration in the second reconfiguration message corresponding to the information of the central unit according to the information of the central unit in the indication information, and applies the configuration in the radio resource control layer.

17. The apparatus according to claim 16, wherein,
there exists a correspondence between identification information of the configuration in the second reconfiguration message and identification information of a target cell in the first reconfiguration message, or
there exists a correspondence between identification information of the configuration in the second reconfiguration message and identification information of configuration in the first reconfiguration message, or
there exists a correspondence between a target cell and identification information of the configuration or the configuration included in the second reconfiguration message.

18. The apparatus according to claim 11, wherein,
the indication information indicates the configuration applied by the radio device.

19. An apparatus for transmitting a signal, applicable to a source central unit, comprising:
a fourth transmitter configured to transmit a first reconfiguration message to an integrated access and backhaul node; and
a fifth transmitter configured to transmit a second reconfiguration message to a radio device,
in the second reconfiguration message, a target candidate cell having the same identifier as a current serving cell of the integrated access and backhaul node is configured once.

20. The apparatus according to claim 19, wherein,
the radio device is:
a terminal equipment,
or, a next level integrated access and backhaul node of the integrated access and backhaul node.

* * * * *